United States Patent
Cho et al.

(10) Patent No.: US 10,666,780 B2
(45) Date of Patent: May 26, 2020

(54) MOBILE TERMINAL AND CONTROL METHOD THEREFOR

(71) Applicant: LG ELECTRONICS INC., Seoul (KR)

(72) Inventors: Taehoon Cho, Seoul (KR); Wonseok Joung, Seoul (KR); Youngjoon Kim, Seoul (KR); Minkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/068,482

(22) PCT Filed: Jan. 21, 2016

(86) PCT No.: PCT/KR2016/000669
§ 371 (c)(1),
(2) Date: Jul. 6, 2018

(87) PCT Pub. No.: WO2017/119531
PCT Pub. Date: Jul. 13, 2017

(65) Prior Publication Data
US 2019/0028579 A1 Jan. 24, 2019

(30) Foreign Application Priority Data

Jan. 7, 2016 (KR) .................. 10-2016-0002262

(51) Int. Cl.
*H04M 1/02* (2006.01)
*G06F 1/16* (2006.01)
(Continued)

(52) U.S. Cl.
CPC .......... *H04M 1/0268* (2013.01); *G06F 1/169* (2013.01); *G06F 1/1616* (2013.01);
(Continued)

(58) Field of Classification Search
CPC .............. H04M 1/0268; H04M 1/0214; G06F 3/04883; G06F 3/03547;
(Continued)

(56) References Cited

U.S. PATENT DOCUMENTS

2010/0137027 A1* 6/2010 Kim ................... G06F 3/03547
455/556.1
2011/0241998 A1* 10/2011 McKinney ............ G06F 1/1616
345/168
(Continued)

FOREIGN PATENT DOCUMENTS

| KR | 10-2013-0138659 A | 12/2013 |
|----|-------------------|---------|
| KR | 10-2015-0107476 A | 9/2015 |
| KR | 10-2015-0135038 A | 12/2015 |

*Primary Examiner* — Mark W Regn
(74) *Attorney, Agent, or Firm* — Birch, Stewart, Kolasch & Birch, LLP

(57) ABSTRACT

The present invention relates to a mobile terminal having a display unit, at least a part of which can be curved or bent. The mobile terminal according to one embodiment of the present invention comprises: a main body formed such that at least a part thereof can be folded; a flexible display provided on the front side of the main body and formed such that a part thereof is exposed to the outside with the main body folded; a touch pad provided on the rear side of the main body and disposed to face in the same direction as the part of the flexible display that is exposed to the outside in the state in which the main body is folded; and a controller that controls a part of the flexible display to output screen information associated with a preset type of touch when the preset type of touch is performed on the touch pad in the state in which the main body is folded.

19 Claims, 27 Drawing Sheets

(51) Int. Cl.
*G06F 3/0488* (2013.01)
*G06F 3/0354* (2013.01)
*G06F 3/041* (2006.01)
*G06F 3/044* (2006.01)
*G06F 3/0484* (2013.01)
*G06K 9/00* (2006.01)

(52) U.S. Cl.
CPC .......... *G06F 1/1652* (2013.01); *G06F 1/1681* (2013.01); *G06F 1/1686* (2013.01); *G06F 3/03547* (2013.01); *G06F 3/04883* (2013.01); *G06F 3/04886* (2013.01); *H04M 1/0214* (2013.01); *G06F 3/044* (2013.01); *G06F 3/0414* (2013.01); *G06F 3/04847* (2013.01); *G06F 2203/04102* (2013.01); *G06F 2203/04108* (2013.01); *G06F 2203/04804* (2013.01); *G06K 9/00013* (2013.01)

(58) Field of Classification Search
CPC . G06F 2203/04804; G06F 2203/04108; G06F 2203/04102; G06F 3/04847; G06F 3/044; G06F 3/0414; G06F 1/1616; G06F 3/04886; G06F 1/1686; G06F 1/169; G06F 1/1652; G06F 1/1681; G06K 9/00013

See application file for complete search history.

(56) References Cited

U.S. PATENT DOCUMENTS

| | | | | |
|---|---|---|---|---|
| 2013/0222295 | A1* | 8/2013 | Lim | G06F 3/041 345/173 |
| 2013/0342090 | A1 | 12/2013 | Ahn et al. | |
| 2014/0071323 | A1* | 3/2014 | Yi | G06F 3/04883 348/333.01 |
| 2014/0372938 | A1* | 12/2014 | Park | G06F 3/0488 715/793 |
| 2014/0380247 | A1* | 12/2014 | Tecarro | G06F 3/0483 715/863 |
| 2015/0153951 | A1* | 6/2015 | Kim | G06F 3/0414 715/773 |
| 2015/0278577 | A1* | 10/2015 | Cho | G06F 3/041 382/124 |
| 2015/0338888 | A1* | 11/2015 | Kim | G06F 1/1677 345/156 |

* cited by examiner (a)

(b)

(a)

(b)

MOBILE TERMINAL AND CONTROL METHOD THEREFOR

CROSS REFERENCE TO RELATED APPLICATIONS

This application is the National Phase of PCT/KR2016/000669 filed on Jan. 21, 2016, which claims priority under 35 U.S.C. § 119(a) to Patent Application No. 10-2016-0002262 filed in Republic of Korea on Jan. 7, 2016, all of which are hereby expressly incorporated by reference into the present application.

TECHNICAL FIELD

The present disclosure relates to a mobile terminal in which a display unit is curved or bent in at least a portion thereof.

BACKGROUND ART

Terminals may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

The functions of mobile terminals are diversified. For example, there are functions of data and voice communication, photographing and video shooting through a camera, voice recording, music file playback through a speaker system, and outputting an image or video to a display unit. Some terminals are equipped with an electronic game play function or a multimedia player function. In particular, modern mobile terminals may receive multicast signals that provide visual content such as broadcast, video or television programs.

As functions are diversified, terminals are implemented in the form of multimedia devices supporting composite functions such as photographing or video shooting, music or video file playback, playing games, receiving broadcast, and the like.

In order to support and enhance the functions of mobile terminals, improvement of structural parts and/or software parts of mobile terminals may be considered.

Such mobile terminals have evolved into various types of designs, and efforts have been made to develop mobile terminals in a newer form in order to meet the needs of users who desire newer and various types of designs. A new form includes structural changes and improvement for users to use mobile terminals more conveniently. As one of such structural changes and improvement, mobile terminals in which at least a portion of a display unit is curved or bent have come to prominence.

Accordingly, in recent years, user interface/user experience (UI/UX) has been actively developed to correspond to a bowing or bending motion of the display unit.

DISCLOSURE

Technical Problem

An aspect of the present disclosure provides a mobile terminal capable of controlling, in an optimized manner, a portion of a flexible display exposed to the outside when the flexible display is folded, and a control method thereof.

Another aspect of the present disclosure to provide a mobile terminal capable of controlling a flexible display using a touch pad provided on a rear surface of a main body, and a control method thereof.

Another aspect of the present disclosure is to provide a mobile terminal in which a portion exposed to the outside when a flexible display is folded may be controlled using a touch pad provided on a rear surface of a main body, and a control method thereof.

Technical Solution

According to an aspect of the present disclosure, there is provided a mobile terminal including: a main body configured such that at least a portion thereof is folded; a flexible display provided on a front surface of the main body and configured such that one portion thereof is exposed to the outside in a state in which the main body is folded; a touch pad provided on a rear surface of the main body and disposed to face in the same direction as that of the one portion of the flexible display exposed to the outside in a state in which the main body is folded; and a controller configured to control the one portion of the flexible display to output screen information linked to (or associated with) a preset type of touch when the preset type of touch is applied to the touch pad in a state in which the main body is folded.

In an embodiment, different pieces of screen information may be output on the one portion of the flexible display according to touch types applied to the touch pad.

In an embodiment, when a first type of touch is applied to the touch pad, the controller may output first screen information linked to the first type of touch on the one portion of the flexible display, and when a second type of touch different from the first type of touch is applied to the touch pad, the controller may output second screen information different from the first screen information on the one portion of the flexible display.

In an embodiment, at least one graphic object may be output on the one portion of the flexible display, and when a touch applied to the touch pad is released, the controller may execute any one of the at least one graphic object.

In an embodiment, a plurality of graphic objects may be output on the one portion of the flexible display, and the controller may set a plurality of points respectively linked to the plurality of graphic objects with respect to a touch point of the touch pad to which a touch is applied.

In an embodiment, in a state in which the plurality of graphic objects are output on the one portion of the flexible display, the controller may display a graphic object linked to a point to which a touch is applied, among the plurality of points, such that the graphic object is visually distinguished from the other graphic objects.

In an embodiment, when the touch is released, the controller may output an execution screen corresponding to a function linked to the graphic object displayed to be visually distinguished on the one portion of the flexible display.

In an embodiment, the mobile terminal may further include: a home button overlapping a fingerprint recognition sensor, wherein when fingerprint recognition with respect to a fingerprint of a finger in contact with the home button is successful using the fingerprint recognition sensor in a state in which the main body is folded, the controller may output a first image related to payment on the one portion of the flexible display.

In an embodiment, when a preset type of touch is applied to the touch pad in a state in which the first image is output, the controller may switch the output first image to a second image related to payment.

In an embodiment, when the folded main body is unfolded by an external force, the controller may output screen information related to payment on the entire region of the flexible display.

In an embodiment, when a predetermined period of time has lapsed in a state in which the main body is folded, the controller may enter a first mode, and when a preset type of touch is applied to the touch pad in the first mode, the controller may enter a second mode different from the first mode.

In an embodiment, when a preset type of touch is applied to the touch pad provided on the rear surface of the main body in a state in which the main body is flat, the controller may switch the first screen information displayed on the flexible display to second screen information different from the first screen information.

In an embodiment, when touches applied to both the flexible display and the touch pad are maintained for a predetermined period of time in a state in which the main body is flat, the controller may capture screen information output on the flexible display.

In an embodiment, when a preset type of touch is applied to the touch pad provided on the rear surface in a state in which the main body is flat and the flexible display is inactive, the controller may switch the flexible display from the inactive state to an active state.

In an embodiment, when a predetermined period of time has lapsed in a state in which the man body is flat and the flexible display is active, the controller may switch the flexible display from the active state to an inactive state, and when a touch is applied to the touch pad before the predetermined period of time has lapsed, the controller may maintain the flexible display in the active state.

In an embodiment, when a drag touch is applied to the touch pad in a state in which the main body is flat, the controller may control at least one of brightness of an output of the flexible display and the volume.

In an embodiment, the mobile terminal may further include: a camera, wherein when a touch is applied to the touch pad in a state in which the main body is flat and a preview image received through the camera is being output on the flexible display, the controller may capture the preview image.

In an embodiment, in a state in which the main body is flat and first screen information is output on the flexible display, a preset type of touch is applied to the touch pad after an event occurs, the controller may adjust transparency of the first screen information and the second screen information such that at least one of the first screen information and the second screen information related to the event may be identified.

According to another aspect of the present disclosure, there is provided a method of controlling a mobile terminal including: allowing a flexible display to be folded such that one portion of the flexible display is exposed; and controlling the one portion of the flexible display when a touch is applied to a touch pad provided on a rear surface of a main body in a state in which the flexible display is folded.

In an embodiment, different pieces of screen information may be output on the one portion of the flexible display according to touch types applied to the touch pad.

Advantageous Effects

According to the present disclosure, a new user interface capable of controlling an exposed portion of the flexible display or the flexible display in an optimized manner using the touch pad provided on the rear surface of the main body when the main body is folded or unfolded may be provided.

BEST MODES

Figure 1A:
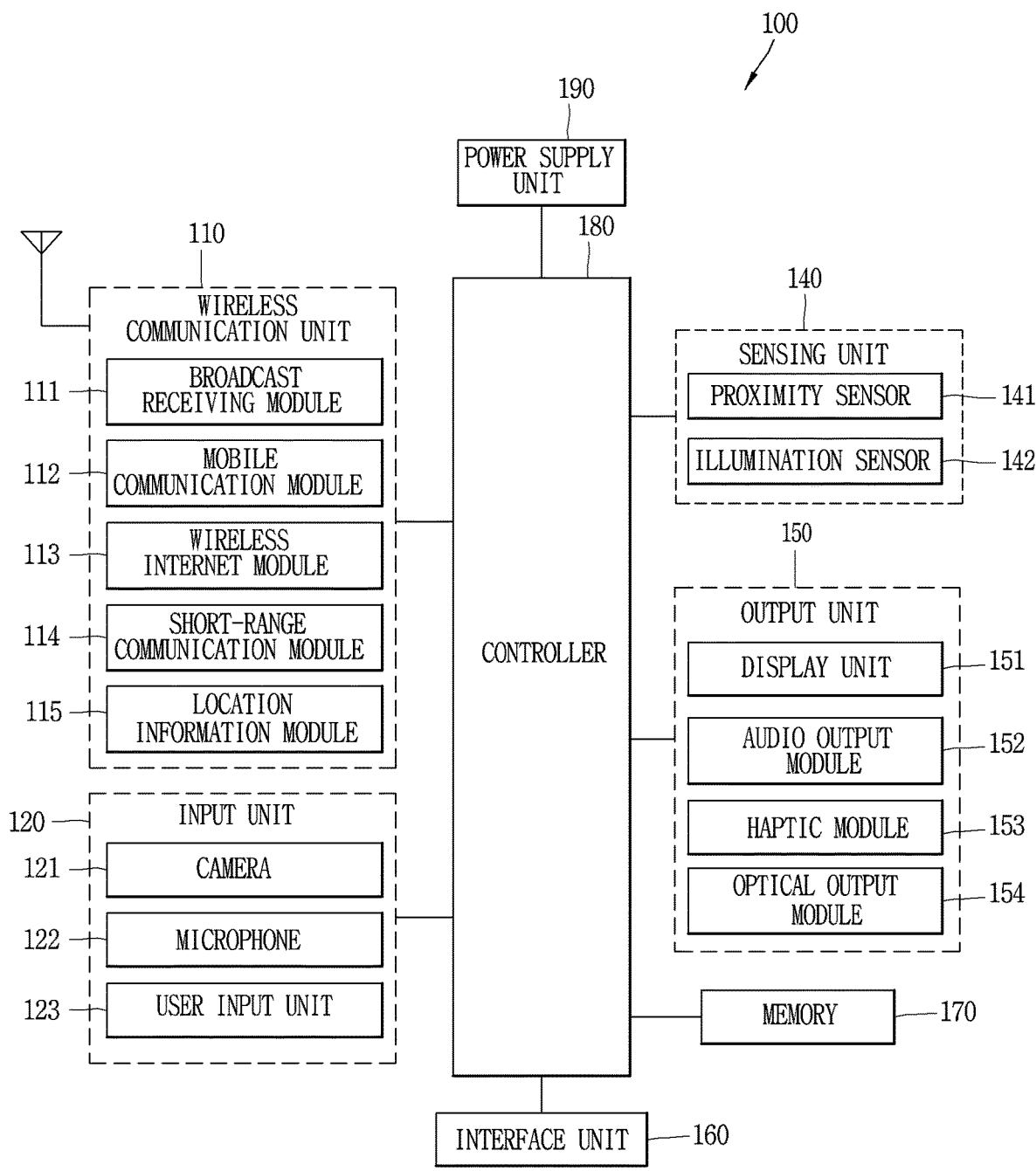
FIG. 1A is a block diagram illustrating a mobile terminal according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
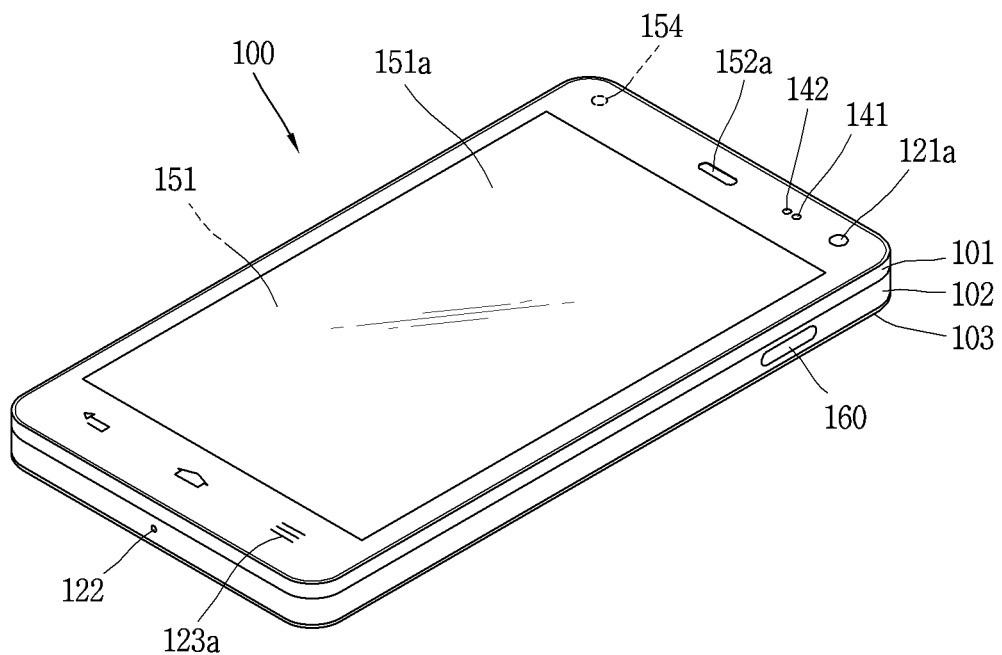
FIGS. 1B and 1C are conceptual views illustrating an example of a mobile terminal according to the present disclosure, viewed in different directions.
Figure 1C:
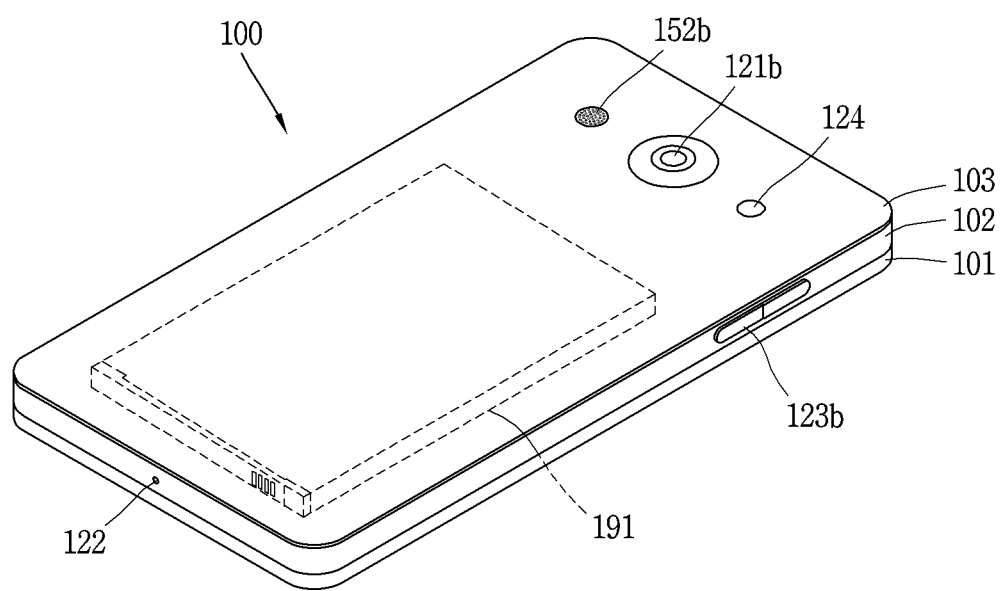

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform any function among other modules of the wireless communication unit 110 to obtain data regarding a location of a mobile terminal substitutively or additionally. The location information module 115 is used to obtain a location (or current location) of a mobile terminal and is not limited to a module which directly calculates or obtains a location of a mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body can be understood as a concept of referring to the mobile terminal 100 as at least one aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present disclosure, information processed in the mobile terminal may be displayed using a flexible display. This will be described in detail with reference to the accompanying drawings.

Figure 2:
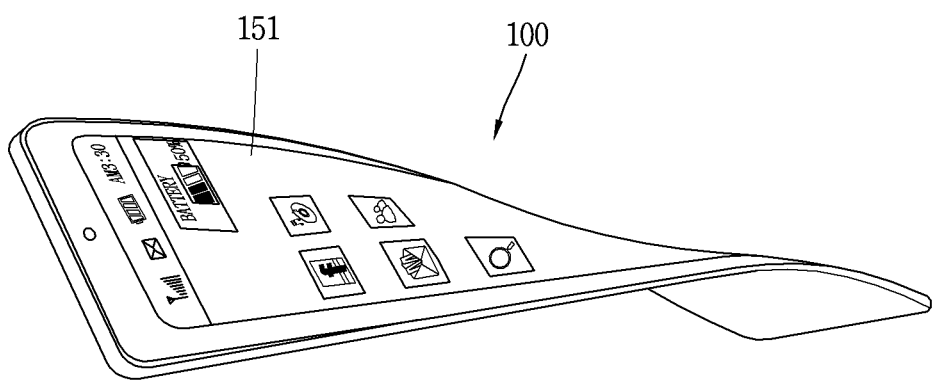
FIG. 2 is a conceptual view for explaining another example of a mobile terminal according to the present disclosure.

FIG. 2 is a conceptual view illustrating another example of a deformable mobile terminal 200 according to an embodiment of the present disclosure.

As illustrated, the display unit 251 may be configured to be deformable by an external force. The deformation may be at least one of bowing, bending, folding, twisting, and rolling of the display unit 251. The deformable display unit 251 may be referred to as a "flexible display unit" or a "bendable display unit". Here, the flexible display unit 151 may include a general flexible display, e-paper, and a combination thereof. In general, the mobile terminal 200 may include features the same as or similar to those of the mobile terminal 100 of FIGS. 1A to 1C.

The general flexible display refers to a solid display manufactured on a thin, pliable substrate which is bowable, bendable, foldable, and twistable, or rollable, so as to be light and not easily brittle, while maintaining characteristics of an existing flat panel display.

Also, the e-paper, based on a display technology employing features of a general ink, may be different from an existing flat panel display in that it uses reflected light. In e-paper, information may be changed using electrophoresis using a twist ball or a capsule.

In a state in which the flexible display unit 151 is not deformed (for example, a state in which the display unit 151 has an infinite radius of curvature, which is referred to as a "first state", hereinafter), a display region of the flexible display unit 151 is flat. In a state in which the flexible display unit 151 in the first state is deformed by an external force (for example, a state in which the flexible display unit 151 as a finite radius of curvature, which will be referred to as a "second state", hereinafter), the display region may be curved. As illustrated, information displayed in the second state may be visual information output on the curved surface. The visual information is implemented as light emission of unit pixels (or subpixels) disposed in a matrix form is independently controlled. The subpixel refers to a minimum unit for implementing a single color.

The flexible display unit 151 may be placed in a bent state (for example, a vertically or horizontally bent state), not a flat state, from the first state. In this case, when an external force is applied to the flexible display unit 151, flexible display unit 151 may be deformed to a flat state (or a less bent state) or more bent state.

Meanwhile, the flexible display unit 151 may be combined with a touch sensor to implement a touch screen. When a touch is applied to the touch screen, the controller 180 (please refer to FIG. 1A) may perform controlling corresponding to the touch input. The touch screen may be configured to sense a touch input even in the second state as well as in the first state.

The mobile terminal 200 according to an exemplary embodiment may have a deformation sensing unit for sensing deformation of the flexible display unit 151. The deformation sensing unit may be included in the sensing unit 140 (please refer to FIG. 1A).

The deformation sensing unit may be provided in the flexible display unit 151 or the case 201 to sense information related to deformation of the flexible display unit 151. Here, the information related to deformation may include a direction in which the flexible display unit 151 is deformed, a degree to which the flexible display unit 151 is deformed, a deformed position of the flexible display unit 151, a deformation time, acceleration at which the deformed flexible display unit 151 is restored, and the like, and may also include various types of information that can be sensed as the flexible display unit 151 is bent.

Also, on the basis of the information related to deformation of the flexible display unit 151 sensed by the deformation sensing unit, the controller 180 may change information displayed on the flexible display unit 151 or generate a control signal for controlling a function of the mobile terminal 200.

Meanwhile, the mobile terminal 200 according to the modified example may include a case 201 accommodating the flexible display unit 151. The case 201 may be configured to be deformable together with the flexible display unit 151 by an external force in consideration of characteristics of the flexible display unit 151.

In addition, a battery (not shown) provided in the mobile terminal may also be configured to be deformable together with the flexible display unit 151 by an external force in consideration of characteristics of a battery (not shown) or the flexible display unit 151 provided in the mobile terminal 200. In order to implement the battery, a stack and folding scheme in which battery cells are piled upwardly may be applied.

State deformation of the flexible display unit 151 is not limited to state information based on an external force. For example, the flexible display unit 151 in the first state may be deformed to the second state by a user command or a command of an application.

Hereinafter, the flexible display unit 151 related to the present disclosure will be described in more detail with reference to the accompanying drawings. Hereinafter, the flexible display unit 151 will be referred to as a' flexible display 151'.

FIGS. 3A, 3B, 3C, 4A, 4B, 4C, and 5 are conceptual views illustrating a flexible display according to the present disclosure.

Figure 3A:
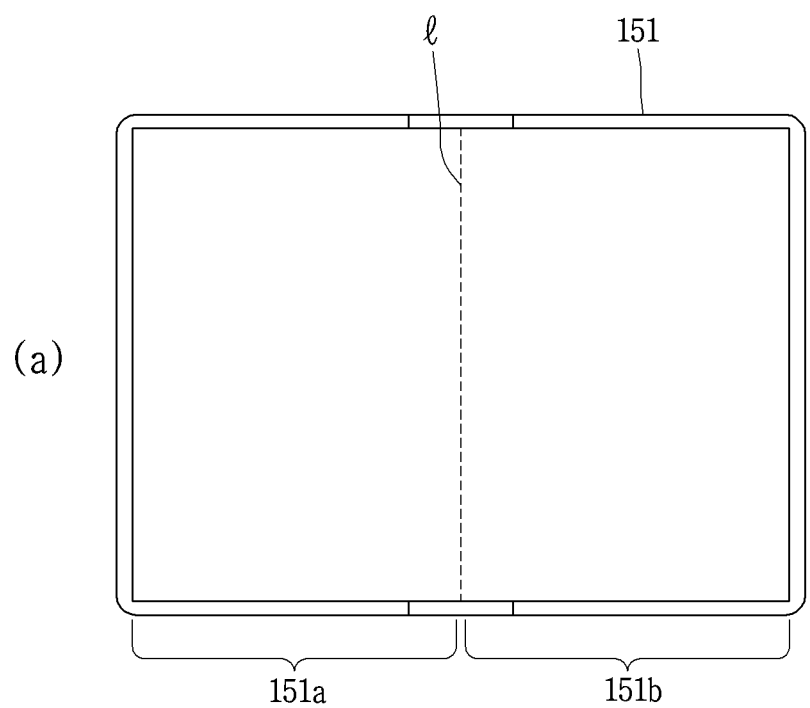
FIGS. 3A, 3B, 3C, 4A, 4B, 4C and 5 are conceptual views for explaining a flexible display according to the present disclosure.
Figure 3A:
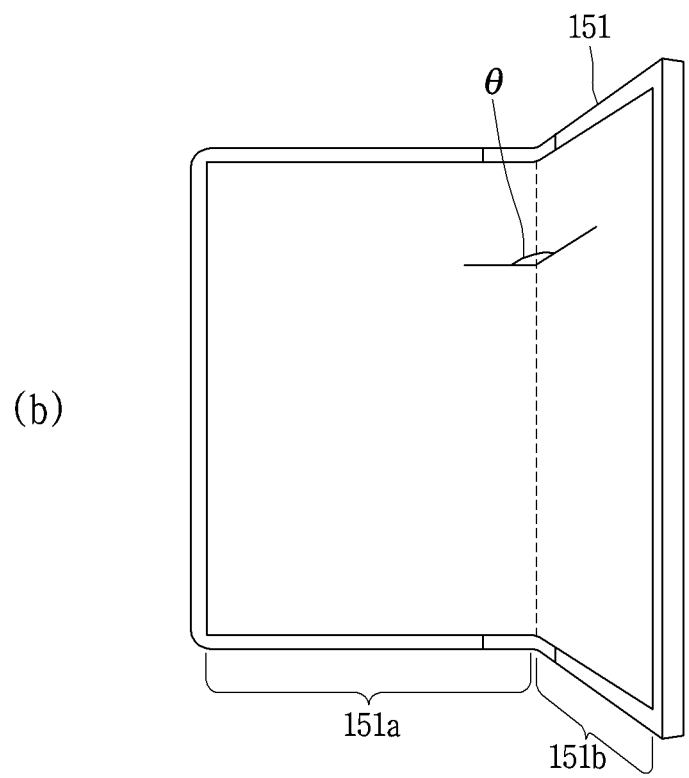

Referring to FIG. 3A, the flexible display 151 related to the present disclosure may be bent, curved, folded, twisted, or rolled in at least a portion by an external force. In the present disclosure, expression of any one of bowing, bending, folding, twisting, and rolling will be used, and the contents containing the corresponding expression may be applied to the other expressions in the same or similar manner.

As illustrated in (a) of FIG. 3A, the flexible display according to the present disclosure may be folded on the basis of the virtual line I. The virtual line I may be fixedly placed at a specific position when the mobile terminal 100 or the flexible display according to the present disclosure is manufactured. However, the present disclosure is not limited thereto and the virtual line at which the flexible display is folded may be varied.

The virtual line I may be one or a plurality of virtual lines. In case where a plurality of virtual lines are provided, the flexible display 151 may be folded a plurality of times.

The virtual line I may be formed to be perpendicular with respect to any one edge (for example, a bottom edge) of the flexible display, or may be sloped at a predetermined angle with respect to the one edge.

The virtual line I may be formed such that the flexible display is foldable in a horizontal direction or folded in a vertical direction.

When an external force is applied in any one direction as illustrated in (a) of FIG. 3A, one portion (or a first portion) 151a and the other portion (or a second portion) 151b of the flexible display may be folded at a specific angle θ with respect to the virtual line I as illustrated in (b) of FIG. 3A. The specific angle θ may be omnidirectional ((0 degrees to 360 degrees), for example. When the specific angle θ is 360 degrees, the flexible display may be in a flat state. In addition, when the specific angle θ Is 0 degree, the flexible display may be in a folded state in which the first portion 151a and the second portion 151b of the flexible display are in contact with each other.

In other words, when an external force is applied to the flexible display 151, the second portion 151b (i.e., the second portion contiguous to the first portion 151a) of the flexible display 151 may relatively rotate in a direction in which the external force is applied, with respect to the first portion 151a of the flexible display 151.

Figure 3B:
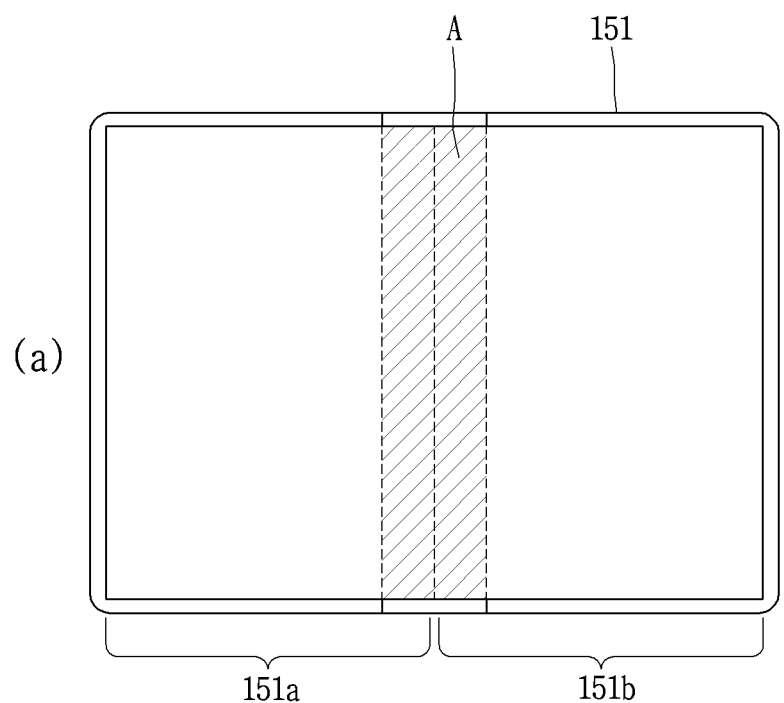
Figure 3B:
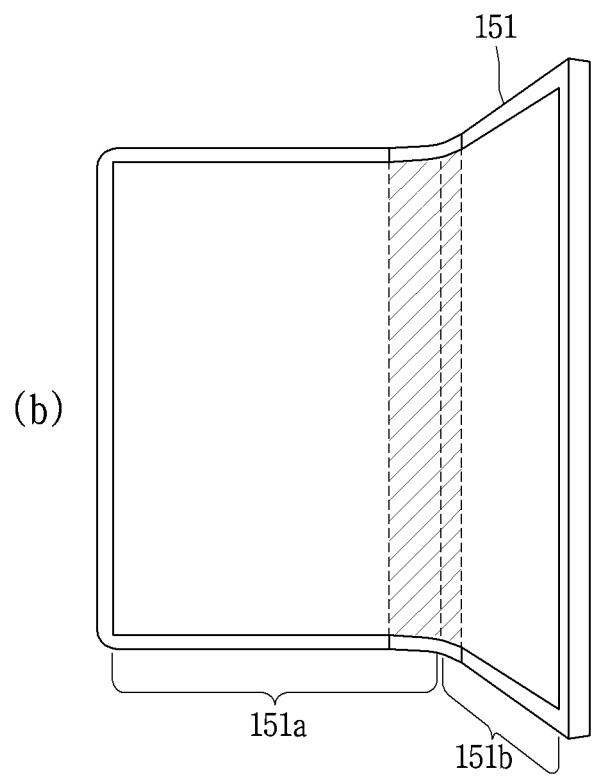

Meanwhile, as illustrated in (a) of FIG. 3B, one region A (or a bent region or folded region) of the flexible display 151 related to the present disclosure may be bent (or curved).

Specifically, the flexible display 151 may be bent by an external force to form a specific radius of curvature based on a central axis of the one region A.

In this case, a portion of the first portion 151a of the flexible display 151 and a portion of the second portion 151b of the flexible display 151 may be bent.

In this case, the angle θ between the first portion 151a and the second portion 151b of the flexible display 151 may be defined as an angle between a virtual line extending from a flat portion of the first portion 151a and a virtual line extending from a flat portion of the second portion 151b.

The relative rotation of the first and second portions of the flexible display 151 described herein may also be applicable to a case where one region A of the flexible display is bent as illustrated in FIG. 3B.

One region A in which the flexible display 151 is bent may be fixedly disposed at a specific position when the mobile terminal 100 or the flexible display according to the present disclosure is manufactured. However, the present disclosure is not limited thereto, and region A in which the flexible display 151 is bent may be variable.

The one region A may be one or a plurality of regions. In case where a plurality of regions are provided, the flexible display 151 may be formed to be bent in a plurality of sections.

The one region A may be formed vertically with respect to one edge (for example, the bottom edge) of the flexible display, or may be formed by twisting to have a specific angle.

The one region A may be formed such that the flexible display is bent in the horizontal direction or in the vertical direction.

The size of the region A where the flexible display 151 is bent may be constant or may vary depending on the extent to which the flexible display 151 is bent. For example, the size of the one region A may be increased as the degree of bending of the flexible display is larger (or as the degree to which the second portion 151b relatively rotates with respect to the first portion 151a of the flexible display 151 is larger or as the angle between the first portion 151a and the second portion 151b is smaller).

Hereinafter, for convenience of explanation, a case where the flexible display 151 is folded with respect to the virtual line as illustrated in FIG. 3A will be described as an example. However, the contents may also be inferred and applied in the same or similar manner even in case where one region A of the flexible display 151 is bent as described above with reference to FIG. 3B.

Figure 3C:
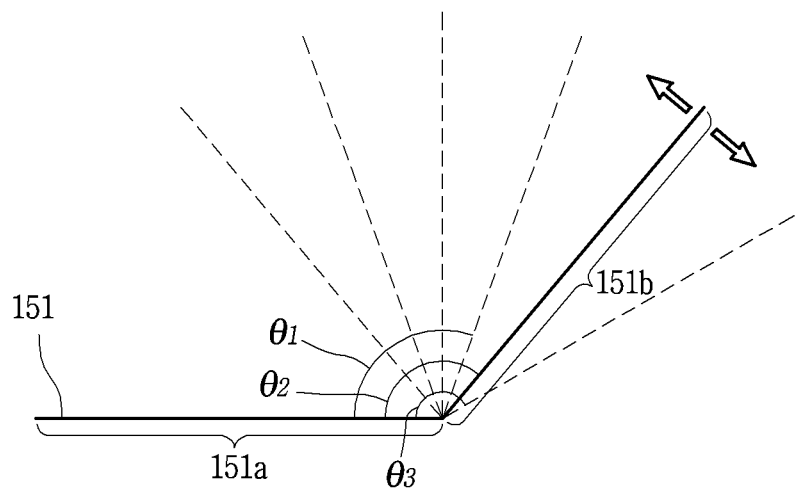

Referring to FIG. 3C, the flexible display 151 related to the present disclosure may be folded such that the first portion 151a of the flexible display and the second portion 151b adjacent to the first portion form a predetermined angle (or may be bent).

The predetermined angle may be at least one (or in plurality) as illustrated in FIG. 3C. For example, the flexible display 151 may be fixed in a folded state by an external force such that the angle between the first portion 151a and the second portion 151b of the flexible display is a first angle θ1 and may be fixed in a folded state to have a second angle θ2 different from the first angle.

Meanwhile, if an external force is not applied in a state in which the angle between the first and second portions 151a and 151b is changed by an external force to have an angle other than the preset angles, any one of the first and second portions 151a and 151b of the flexible display 151 may be relatively rotated to have any one of the preset angles. That is, the flexible display according to the present disclosure may have elasticity (or tension, restoring force, etc.) such that folding is maintained at a predetermined angle (or a specific angle).

For example, as illustrated in FIG. 3C, in a state in which the angle between the first portion 151a and the second portion 151b of the flexible display is fixed to second angle θ2, the angle is changed by an external force. In this case, if the external force is stopped before the angle reaches the first angle θ1 or the third angle θ3, the first portion 151a and the second portion 151b of the flexible display may be restored (or returned) such that the angle therebetween is the second angle θ2. In this case, it may be understood that the flexible display 151 is folded at at least one of (or a plurality of) predetermined angles.

However, the present disclosure is not limited thereto, and if the external force is stopped in a state in which the flexible display 151 is folded at a certain angle between the first portion 51a and the second portion 151b by the external force, the flexible display 151 may be fixed such that the certain angle is maintained. In this case, it may be understood that the flexible display 151 may be fixed at all angles, rather than fixed at only a predetermined angle.

Hereinafter, an embodiment of a structure of a mobile terminal according to the present disclosure, which is configured to allow the flexible display 151 to be folded or bent as described in FIGS. 3A to 3C, will be described with reference to FIGS. 4A to 4C.

Figure 4A:
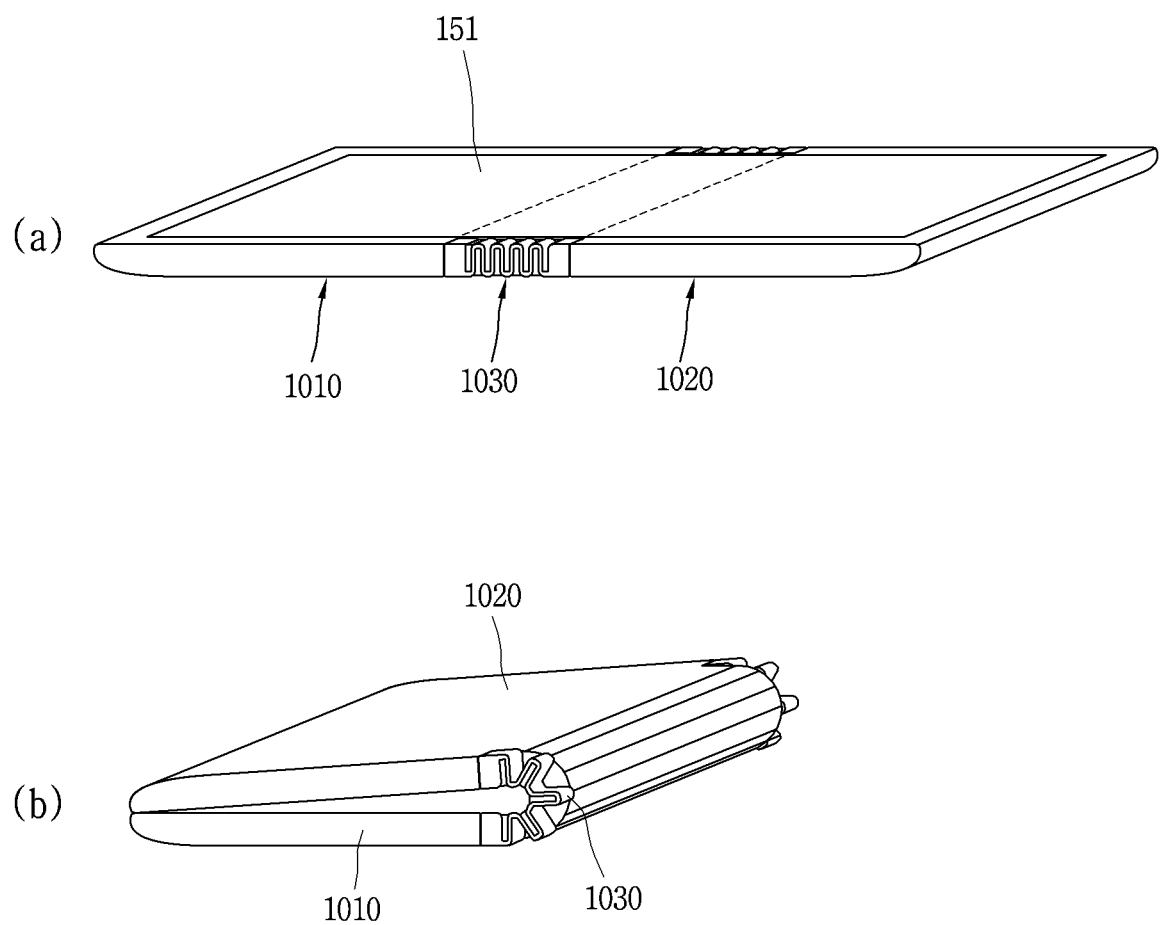

In an embodiment, as illustrated in FIG. 4A, the mobile terminal according to the present disclosure includes a case forming an appearance, a flexible display 151 disposed on the front surface, and the sensing unit 140 (or a deformation sensing unit) for sensing deformation of the display 151.

The flexible display 151 is formed to bendable or foldable. Here, folding refers to a state in which a radius of curvature of a part of the body of the mobile terminal is kept smaller than a reference value, that is, in other words, a folded state. In the case of folding, the screens of the display unit 151 are in contact with each other or positioned to be close to each other.

In contrast, bending refers to a state in which a radius of curvature of a part of the body of the mobile terminal is maintained to be larger than the reference value, namely, a bent state.

Folding and bending may also be classified depending on the degree of bending. For example, when the flexible display is bent such that the angle between the first portion and the second portion is smaller than a predetermined angle, it may be defined as folding, and when the flexible display is bent such that the angle between the first portion and the second portion is equal to or greater than the predetermined angle, it may be defined as bending. Also, although the flexible display is bent at an angle smaller than the predetermined angle, if the radius of curvature is greater than the reference value, it may be defined as bending.

Referring to these figures, in a state in which the flexible display 151 forms a single plane as illustrated in (a) of FIG. 4A, the state of the display 151 may be switched to a state in which a shape of at least a part of the display portion 151 is changed. The state in which the shape is changed may be a state in which the flexible display 151 is folded as illustrated in (b) of FIG. 4A. That is, the display unit 151 may be configured to be positioned in a first state (See (a) of FIG. 4A) in which a specific region is a plane and to be positioned in a second state (See (b) of FIG. 4A) in which the specific region is folded as a curved surface.

Also, in the folded state, a connection portion 1030 may have a curved trace. The curved trace may be a portion of the circumference of a circle or a portion of the circumference of an oval. The connection portion 1030 is formed to connect a first body portion 1010 and a second body portion 1020, and the first body portion 1010 and the second body portion 1020 may be bent or folded at a certain angle. Accordingly, the flexible display 151 provided on the front surface of the first and second body portions 1010 and 1020 and the connection portion 1030 may be bent or folded when the connection portion 1030 is bent.

The connection portion 1030 may be configured to be fixed in a state of being bent at at least one preset angle (or every angle) so that the angle between the first portion 151a and the second portion 151b may be at least one preset angle (or every angle) as described above in FIG. 3C.

In addition, the flexible display 151 may include a plurality of folded regions. That is, the mobile terminal related to the present disclosure may include a plurality of connection portions 1030. In this case, the left and right ends of the body of the mobile terminal may be folded to provide a dual foldable display.

Figure 4B:
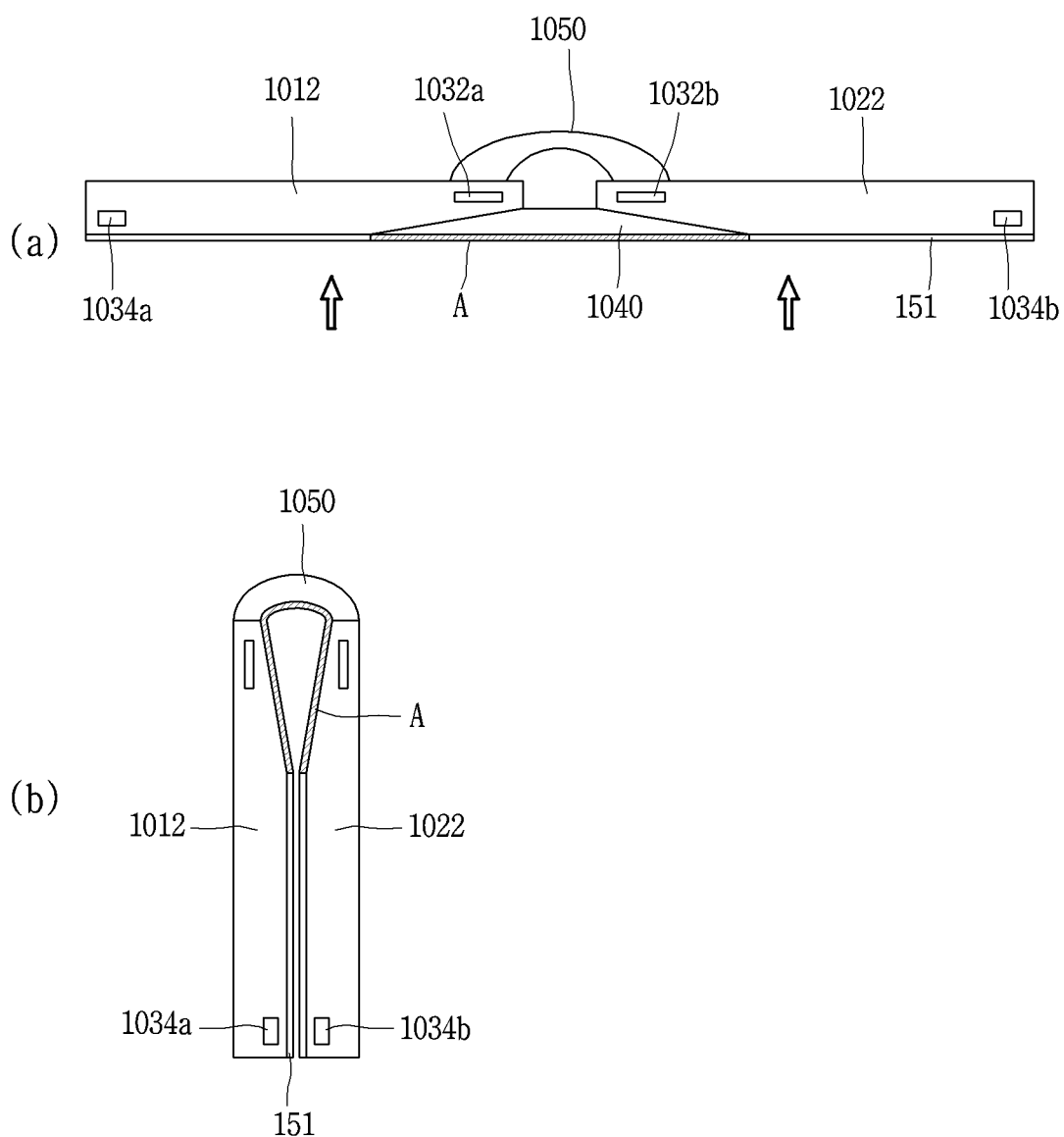
Figure 4C:
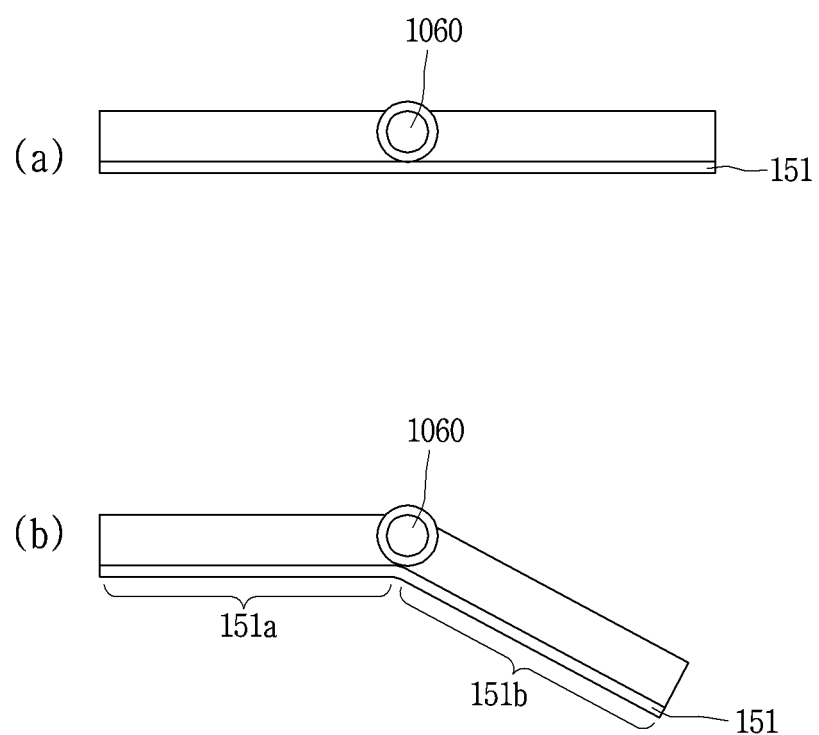

Meanwhile, in the mobile terminal 100 related to the present disclosure, as illustrated in (a) of FIG. 4B, a space 1040 may be formed between a first body portion 1012, a second body portion 1022, and the flexible display 151 such that a bent region A (one region, a bent region, or a folded region) of the flexible display) may be positioned therein when the flexible display 151 is bent (or folded).

The connection portion 1050 may be configured to connect the first body portion 1012 and the second body portion 1022 and form a space so that the bent portion A of the flexible display is positioned.

Thereafter, as illustrated in (b) of FIG. 4B, when the flexible display 151 is bent (or folded) by an external force, the bent portion A of the flexible display 151 may be positioned in the space 1040.

The first and second body portions 1012 and 1022 of the mobile terminal 100 according to the present disclosure may have magnets 1032a and 1032b for maintaining (fixing) the first body portion 1012 and the second body portion 1022 in a straight line so that the flexible display 151 is in a flat state.

The first and second body portions 1012 and 1022 may have magnets 1034a and 1034b for fixing the first body portion 1012 and the second body portion 1022 to be folded at an adjacent distance such that the flexible display 151 may be maintained in a folded state.

In another embodiment, the mobile terminal 100 according to the present disclosure may have a hinge 1060 adjusting the angle between the first body portion and the second body portion. The hinge 1060 may be referred to as a connection portion, a fixing portion, or the like.

The first body portion and the second body portion may be relatively rotated with respect to the hinge 1060.

The hinge 1060 includes a locking protrusion and a locking recess to fix the first body portion and the second body portion such that the angle between the first body portion and the second body portion is at least one predetermined angle. In addition, the hinge 1060 may include at least two gears or an elastic spring so that the first body portion and the second body portion may be rotated relatively with respect to each other.

The mobile terminal related to the present disclosure may have a change detecting unit (for example, a rotation sensor, a hall sensor, etc.). The change detecting unit may be a connection portion (or a hinge) itself or may be a separate sensor.

The controller 180 may determine the angle between the first body portion and the second body portion (or the angle between the first portion 151a and the second portion 151b of the flexible display or the extent to which the flexible display is bent or folded), using the change sensing unit.

In addition, the mobile terminal according to the present disclosure may employ a structure in which the flexible display 151 is bent or folded in various manners, and fix (or maintain) such that the angle between at least two portions of the flexible display 151 is a certain angle (or such that a bent region of the flexible display 151 has a certain radius of curvature).

The extent to which the flexible display 151 is bent or folded may be changed by an external force and may be changed in the mobile terminal itself through electrical control.

Meanwhile, the expression "main body" will be used hereinafter. The main body refers to the above-described body and may be understood as a concept including at least one of a first body portion, a second body portion, and a connection portion. The main body may be formed such that at least a portion thereof is folded. The main body uses reference numeral 100, which is the same as that of the mobile terminal.

The flexible display according to the present disclosure may be provided on a front surface of the main body. In addition, the flexible display may be formed such that a portion thereof is exposed to the outside when the main body is folded.

Specifically, the sizes of the first body portion and the second body portion of the body related to the present disclosure may be different from each other. Accordingly, the size of the first region 151a of the flexible display provided on the front surface of the first body portion and the size of the second region 151b of the flexible display provided on the front surface of the second body portion may be different from each other. For example, the size of the first region 151a of the flexible display may be greater than the size of the second region 151b of the flexible display as illustrated in (a) of FIG. 5.

Figure 5:
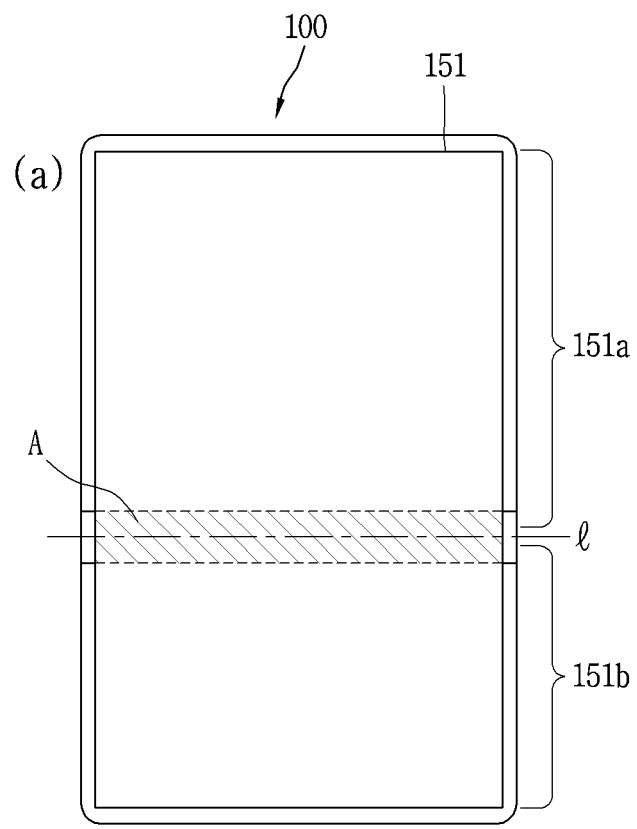
Figure 5:
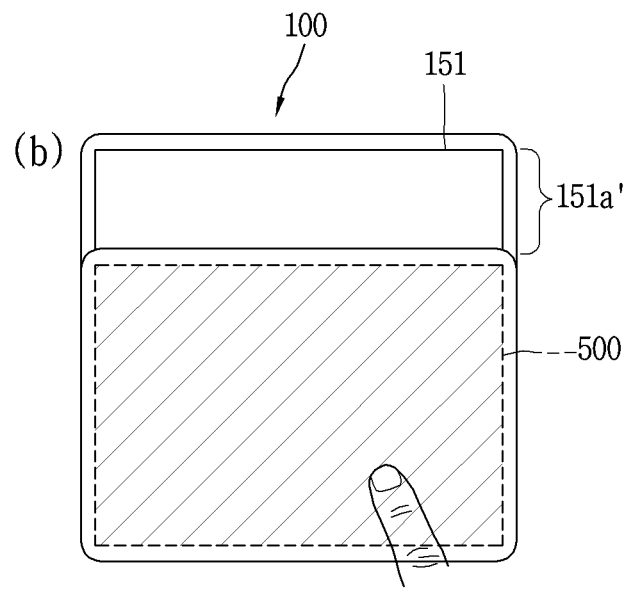

In the mobile terminal 100 of the present disclosure, as illustrated in (a) of FIG. 5, a bent region A (or virtual line I) may be formed such that the first region (or portion) 151a and the second portion 151b of the flexible display 151 are asymmetrical (or have different sizes).

In this case, when the main body of the mobile terminal is folded by an external force (or the flexible display 151 is folded, or the second portion 151b of the flexible display is folded to be brought into contact with at least a portion of the first portion 151a), a portion 151a' of the flexible display 151 (or a portion 151a' of the first portion 151a of the flexible display) is exposed to the outside as illustrated in (b) of FIG. 5.

That is, the mobile terminal related to the present disclosure may be formed such that when the flexible display (or the main body) is folded on the basis of the virtual line I or the bent region A by the external force, the portion 151a' of the flexible display is exposed to the outside.

Hereinafter, for convenience of explanation, the expression of folding or unfolding the main body of the mobile terminal will be used. However, it should be understood that the meaning of folding or unfolding the main body includes the meaning of folding or unfolding the flexible display.

The contents described hereinafter may be inferred and applied to a case where the flexible display is folded such that a portion thereof is exposed or a case where the flexible display is folded such that a portion thereof is exposed by an external force. That is, the virtual line I (or the bent region A) may be fixed in position such that a portion of the flexible display may be folded to expose a portion of the flexible display from the time when the mobile terminal is manufactured, or may be determined (varied) by a user's external force.

Meanwhile, a touchpad may be provided on a rear surface of the main body of the mobile terminal according to the present disclosure. As illustrated in (b) of FIG. 5, the touch pad may be disposed on the rear side of the main body to face in the same direction as that of the portion 151a' of the flexible display exposed to the outside in the state in which the main body is folded.

For example, when the second body portion is formed to be smaller than the first body portion, if the first body portion and the second body portion are folded in contact with each other, a portion 151a' of the flexible display provided on the front surface of the first body portion is exposed to the outside. In this case, the touch pad 500 may be provided on the rear surface of the second body portion. Accordingly, as illustrated in (b) of FIG. 5, the portion 151a' of the flexible display exposed to the outside and the touch pad 500 are oriented in the same direction.

In other words, in case where the size of the upper end portion (or the first body portion) of the main body is larger than the size of the lower end portion (or the second body portion) of the main body, a portion positioned at the upper end portion of the flexible display may be exposed to the outside when at least a portion of the upper end portion and the lower end portion of the main body is folded to be in contact. In this case, the touch pad may be provided on the rear surface of the lower end portion of the main body. Accordingly, when the main body is folded, a portion of the flexible display is exposed to the outside and the touch pad provided on the rear surface of the main body is oriented in the same direction as that of the portion of the flexible display exposed to the outside.

The touch pad 500 functions to sense (or detect) a touch input. The touch pad may be configured to sense only various types of touch input or may be a display (or a touch screen) that may output any screen information in addition to sensing a touch input.

For example, the touch pad 500 may have an interlayer structure with the touch sensor (or a touch panel) described in FIG. 1A or may be integrally formed. The touch sensor senses a touch (or touch input) applied to the touch pad 500 using at least one of various touch methods such as a resistive type, a capacitive type, an infrared type, an ultrasonic type, and a magnetic field type. Also, the touch pad 500 may be the touch sensor (or the touch panel) itself.

As an example, the touch sensor may be configured to convert a change in a pressure applied to a specific portion of the touch pad or a capacitance generated in a specific portion into an electrical input signal. The touch sensor may be configured to detect a position and an area at which a touch object touches the touch pad (or the touch sensor), a pressure at the time of touch, capacitance at the time of touch, and the like. Here, the touch object is an object applying a touch to the touch pad and may be, for example, a finger, a touch pen, a stylus pen, a pointer, or the like.

In case where the main body is folded (or in a state in which the flexible display is folded), in a state in which a portion of the flexible display exposed to the outside and the main body are folded, the mobile terminal according to the present disclosure may provide various operations, functions, and user interfaces using the touch pad provided on the rear surface of the main body to face the same direction as that of the portion.

Hereinafter, various embodiments of the present disclosure using the above-described flexible display and touch pad will be described in more detail with reference to the accompanying drawings.

Figure 6:
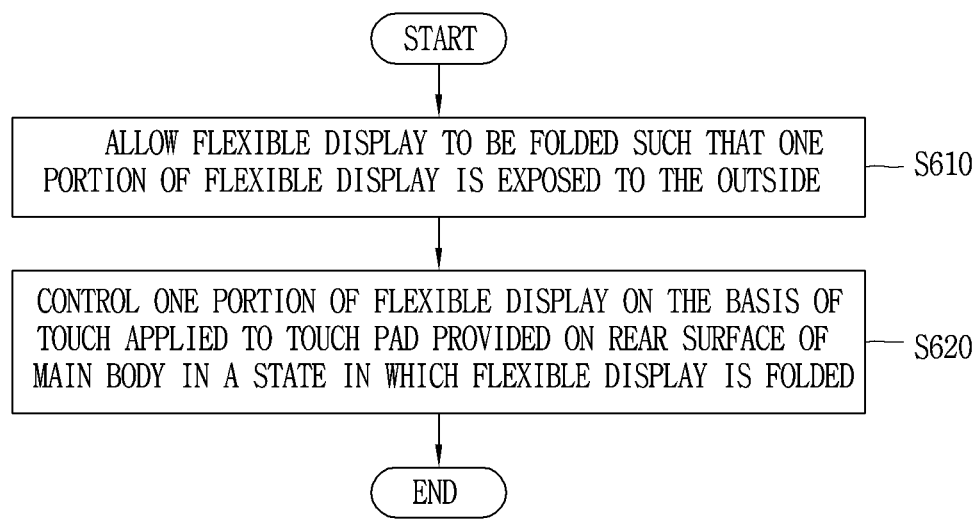
FIG. 6 is a flowchart illustrating a typical control method of the present disclosure.
Figure 7:
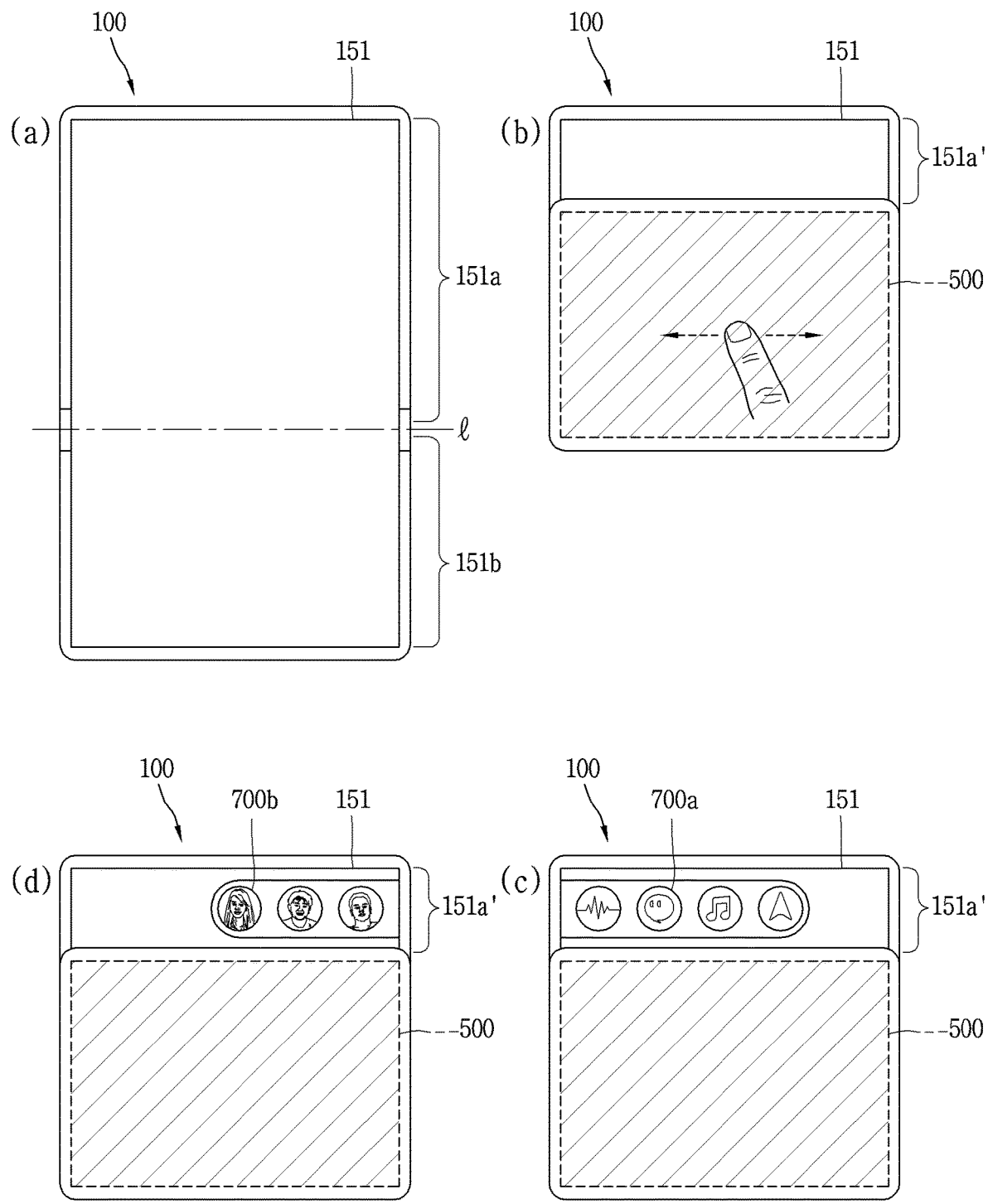
FIG. 7 is a conceptual view for explaining the control method illustrated in FIG. 6.

FIG. 6 is a flowchart for explaining a typical control method of the present disclosure, and FIG. 7 is a conceptual view for explaining the control method illustrated in FIG. 6.

Referring to FIG. 6, in the present disclosure, the flexible display is folded such that a portion of the flexible display is exposed to the outside (S610). In detail, by external force or by a user, the main body (or flexible display) may be folded such that at least portions thereof are in contact with each other or close to each other.

Folding of the flexible display may mean that folding the main body. In this disclosure, the folding of the flexible display means that the bent region A (or the virtual line I) of the flexible display is folded or bent such that the second region (or portion) 151b of the flexible display is in contact with or near at least a portion of the first region (or portion) 151a of the flexible display.

Referring to (a) of FIG. 7, the first region 151a and the second region 151b of the flexible display may have different sizes. A portion of the first region 151a of the flexible display which is not in contact with or close to the second region 151b according to the folding, that is, a portion 151a' of the flexible display may be exposed to the outside as illustrated in (b) of FIG. 7. That is, in the mobile terminal related to the present disclosure, when the main body is folded by an external force, the portion 151a' of the flexible display may be exposed to the outside.

Thereafter, in the present disclosure, in a state in which the flexible display is folded (or in a state in which the main body is folded), a portion of the flexible display is controlled on the basis of a touch applied to the touch pad provided on the rear surface of the main body (S620).

As illustrated in (b) of FIG. 7, the touch pad 500 may be provided on the rear surface of the main body such that it is oriented in the same direction as that of one portion 151a' of the flexible display exposed to the outside when the main body is folded.

When the main body is folded from a flat state by an external force, the controller 180 may output specific screen information to a portion of the flexible display exposed to the outside. For example, the specific screen information may be a status bar capable of displaying time information, remaining battery capacity information, mobile communication status information, an indicator indicating that there is notification information of an application.

As another example, when the main body is folded by an external force in a state in which the flexible display is inactivated, the controller 180 may switch a portion of the exposed flexible display to an active state. As a portion of the flexible display in the active state, for example, the status bar may be displayed. Here, the inactive state may be a state in which the flexible display is OFF, and the active state may be in a state in which at least a portion of the flexible displays is ON.

However, the present disclosure is not limited thereto, and the controller 180 may maintain a portion of the flexible display exposed to the outside in an inactive state although the flexible display is folded by an external force in the inactive state.

Meanwhile, when a preset type of touch is applied to the touch pad 500 disposed on the rear surface of the main body, that is, the touch pad disposed on the rear surface of the main body so as to be placed in the same direction as that of the one portion 151a' of the flexible display exposed to the outside in a state in which the main body is folded, the controller 180 may control the one portion 151' of the flexible display to output screen information associated with the preset type of touch. That is, the screen information associated with the preset type of touch may be output to a portion of the flexible display 151a' exposed to the outside in a state in which the main body is folded.

The preset type of touch may include various types of touches. For example, the various types of touches include a short (tap) touch, a long touch, a double touch, a multi touch, a drag touch, a flick touch, a pinch-in touch, a pinch-out touch, a swype touch, a hovering touch force touch, and the like.

Hereinafter, the various types of touch will be described in more detail.

A short (or tap) touch may be a touch which is released within a predetermined time after the touch object (e.g., a finger, a stylus pen, or the like) is brought into contact with the touch pad 500 (i.e., after the touch is applied). For example, the short (or tap) touch may be a touch in which the touch object touches the touch pad 500 for a short time, such as a single click of a mouse.

The long touch may be a touch that is held for a predetermined time or longer after the touch object is brought into contact with the touch pad 500. For example, the long touch may be a touch which is held for a predetermined time or longer after the touch is applied to the touch pad by the touch object. More specifically, the long touch may be a touch that is released after the touch is held for a predetermined time or longer at a point on the touch pad 500. In addition, the long touch may be understood as a touch corresponding to a touch and hold operation for maintaining the contact state of the touch object for a predetermined time or longer on the touch pad 500.

The double touch may be a touch which is continuously applied at least twice to the touch pad 500 within a predetermined time.

The predetermined time described in the short touch, long touch, and double touch may be determined by a user setting.

The multi-touch may be a touch applied to at least two touch points at substantially the same time on the touch pad 500.

The drag touch may be a touch that contact starting from a first point of the touch pad 500 is continuously applied along one direction on the touch pad 500 and released from a second point different from the first point.

Specifically, the drag touch may be a touch which is applied to one point of the touch pad 500 by the touch object, continuously extends in a state of being maintained on the touch pad 500 and then is released from a point different from the one point.

Also, the drag touch may be a touch which is applied to one point of the touch pad 500 and then continuously extended from the touch.

The flick touch may be a touch to which the drag touch is applied within a predetermined time. Specifically, the flick touch may be a touch in which the touch object applying the drag touch is released from the touch pad 500 within a predetermined time. In other words, the flick touch may be understood as a drag touch which is applied at a speed higher than a predetermined speed.

The swipe touch may be a drag touch applied in a straight line.

The pinch-in touch may be a touch that at least one of first and second touches applied to two different points (two separated points) on the touch pad 500 extends in a direction toward each other. For example, the pinch-in touch may be a touch implemented by an operation of narrowing the intervals of the fingers in a state in which the fingers are in contact with the two points separated on the touch pad 500.

A pinch-out touch may be a touch that touches at least one of first and second touches applied to two different points (two separated points) on the touch pad 500 extends in a direction away from each other. For example, the pinch-out touch may be a touch corresponding to an operation of widening (releasing) each of the fingers in a state in which the finger is in contact with each of the two points separated on the touch pad 500.

The hovering touch may be a touch corresponding to an operation of the touch object in the space away from the flexible display 151, while the touch object is not in contact with the touch pad 500. For example, it may be the proximity touch described above in FIG. 1A. For example, the hovering touch may be a touch corresponding to a motion maintained for a predetermined time or greater at a position spaced apart from the touch pad 500.

The force touch may refer to a touch in which the touch object presses the touch pad 500 at a predetermined pressure (or a preset pressure) or greater. Specifically, the force touch may refer to a touch corresponding to a motion of pressing the touch pad 500 at a predetermined pressure or higher. The predetermined pressure may be determined by the user or may be determined by the characteristics of the touch pad 500 (or a touch panel or a touch sensor for sensing the pressure). The touch pad 500 may be formed so as to be able to measure the extent to which the touch target object presses the touch pad 500 by using a change in voltage, a change in current, a change in a pressure sensor or capacitance.

In this disclosure, any one of the various types of touches described above will be described for each function by way of example. However, the various types of touches described above may be inferred and applied in the same or similar manner to each function.

In this disclosure, as illustrated in (b) of FIG. 7, a portion 151*a*' of the flexible display is a region exposed to the outside in a state in which the main body is folded (or the flexible display is folded) in the entire area of the flexible display.

Different pieces of screen information may be output to one portion 151*a*' of the flexible display according to a touch method applied to the touch pad 500.

Specifically, when a first type of touch is applied to the touch pad 500, the controller 180 may output first screen information associated with the first type of touch on a portion 151*a*' of the flexible display. When a second type of touch different from the first type of touch is applied to the touch pad 500, the controller 180 may output second screen information different from the first screen information to the one portion 151*a*' of the flexible display, For example, as illustrated in (b) of FIG. 7, when a drag touch (or flick touch) is applied to the touch pad 500 in a first direction (for example, right direction), the controller 180 may output first screen information 700*a* to the portion 151*a*' of the flexible display as illustrated in (c) of FIG. 7. That is, the first screen information may be associated with the drag touch applied in the first direction.

When a drag touch (or flick touch) is applied in a second direction (e.g., leftward direction) opposite to the first direction as illustrated in (b) of FIG. 7, the controller 180 may output second screen information 700*b* different from the first screen information as illustrated in (d) of FIG. 7. Also, the second screen information may be associated with the drag touch applied in the second direction.

The first screen information and the second screen information may include at least one graphic object (or an image, an icon, a button, and the like). Also, the first screen information and the second screen information may be the graphic object itself.

For example, the first screen information 700*a* may be an icon of at least one application. The icon of the at least one application may be a 'shortcut' icon set by a user setting or previously set at the time when the mobile terminal is manufactured. The icon of at least one application included in the first screen information may be changed by a preset type of touch applied to the portion 151*a*' of the flexible display or the touch pad 500 or may be changed by a user setting.

As another example, the second screen information 700*b* may be a graphic object related to at least one contact number. The graphic object related to the at least one contact number may be a graphic object related to the number of calls (or SMS, MMS), a contact number to which a call was made recently, a contact number designated by the user, and the like. The graphic object related to at least one contact number included in the second screen information may be changed by a preset type of touch applied to the portion 151*a*' of the flexible display or the touch pad 500 or may be changed according to a user setting.

The first and second screen information may be execution screens of different applications.

In the above description, it is described that the first type of touch is a drag touch applied in the first direction and the second type of touch is a drag touch applied in the second direction. However, the present disclosure is not limited thereto and the preset types of touches described above may be variously applied. For example, when a long touch is applied to the touch pad 500, the controller 180 may output the first screen information to the portion 151*a*' of the flexible display, and when the multi-touch is applied, the controller 180 may output second screen information on the portion 151*a*' of the flexible display.

The related contents may also be inferred and applied to a case where a preset type of touch is applied to the one portion 151*a*' of the flexible display exposed to the outside in a state in which the main body is folded.

In a state in which the main body is folded and any one of the first and second screen information is output on the one portion 151*a*' of the flexible display, when a touch is applied to an icon (or graphic object) output on the one portion 151*a*' of the flexible display, a function associated with the touch-applied icon (or graphic object) may be executed.

Meanwhile, in the present disclosure, in a state in which the main body is folded, a graphic object output on a portion of the flexible display may be selected or executed using the touch pad 500.

Hereinafter, a method of selecting (executing) a graphic object output on a portion of the flexible display using the touch pad 500 will be described in more detail with reference to the accompanying drawings.

FIGS. 8A, 8B, 8C, 9A, 9B, 10, 11A, 11B, 11C and 12 are conceptual views illustrating an embodiment of the present disclosure in which a portion of the flexible display exposed to the outside is controlled using the touch pad provided on the rear surface of the main body in a state in which the flexible display related to the present disclosure is folded.

Figure 8A:
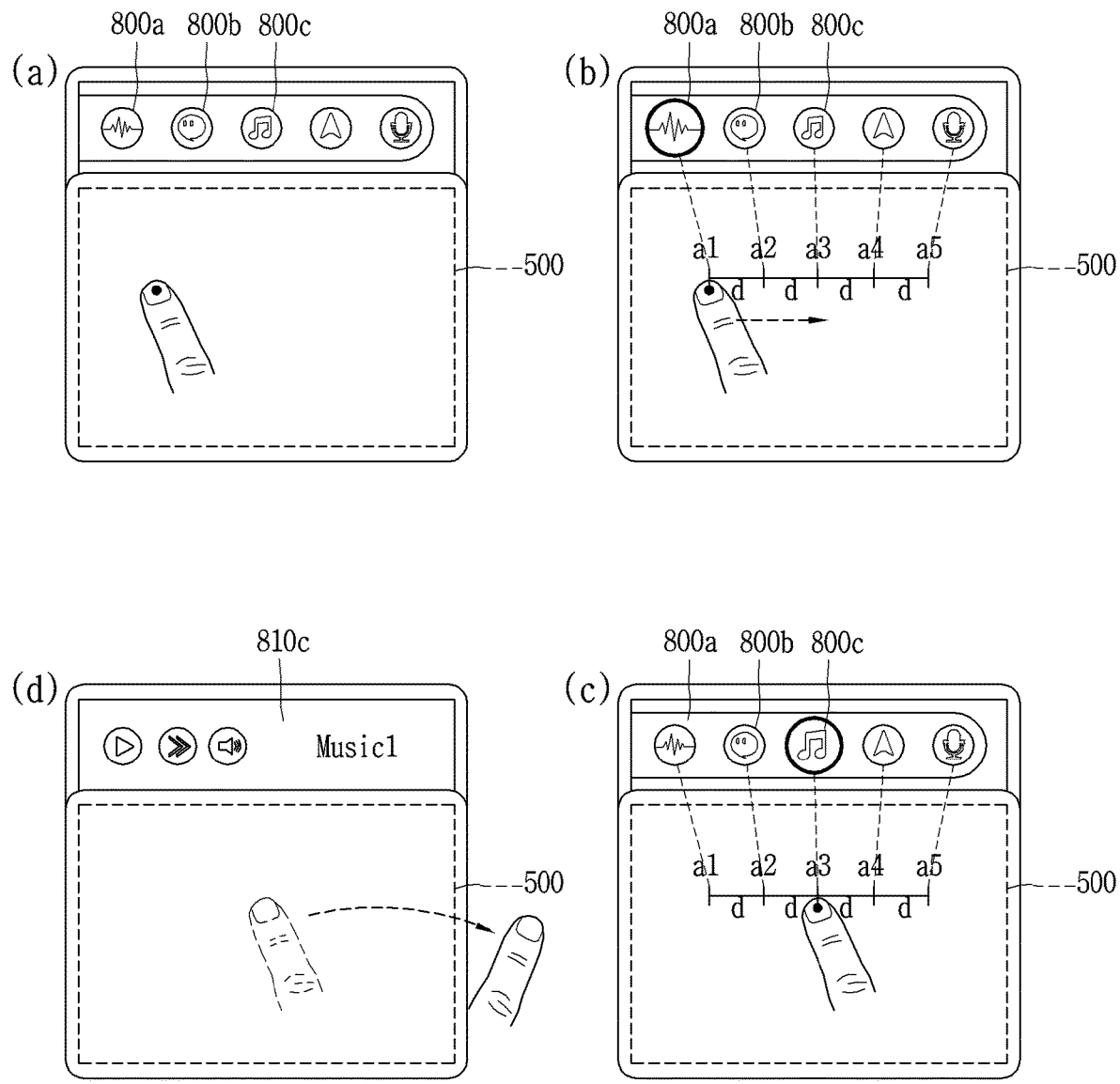
FIGS. 8A, 8B, 8C, 9A, 9B, 10, 11A, 11B, 11C and 12 are views illustrating a state in which an exposed portion of the flexible display is controlled using a touch pad provided on the rear surface of the main body in a state in which the flexible display according to the present disclosure is folded.

First, at least one graphic object 800a, 800b, and 800c may be output on the one portion 151a' of the flexible display as illustrated in (a) of FIG. 8A. The at least one graphic object may be output in the manner described in FIG. 7 or may be output when the flexible display is folded by an external force from a flat state.

In a state in which at least one graphic object is output on one portion of the flexible display, when a touch is applied to the touch pad 500 and then released, the controller 180 may execute (or select) any one of the at least one graphic object.

For example, a plurality of graphic objects 800a, 800b, and 800c may be output on the portion 151a' of the flexible display as illustrated in (a) of FIG. 8A. In this state, the controller 180 may set a plurality of points a1, a2, a3, a4, and a5 respectively associated with the plurality of graphic objects on the basis of the point a1 at which the touch is applied to the touch pad 500.

The number of the plurality of points may correspond to the number of the plurality of graphic objects output on the portion 151a' of the flexible display. Here, the space d between the plurality of points may be equal or different.

The plurality of points respectively linked to the plurality of graphic objects may refer to points set to be selected (or focused) by the plurality of graphic objects.

For example, the first point a1 is a point linked to select the first graphic object 800a among a plurality of graphic objects, and the second point a2 is a point linked to select the second graphic object 800b among the plurality of graphic objects.

The plurality of points may be sequentially matched to the order of the plurality of graphic objects output on the portion 151a' of the flexible display.

In a state in which the plurality of graphic objects are output on the portion 151a' of the flexible display, the controller 180 may display a graphic object linked to a point to which a touch is applied, among the plurality of points, such that the graphic object is visually distinguished from other graphic objects.

For example, as illustrated in (b) of FIG. 8A, the controller 180 may display the graphic object 800a linked to the point a1 to which a touch is applied among the plurality of points, such that it is visually distinguished from other graphic objects. For example, displaying the graphic object to be visually distinguished may include displaying the graphic object in a magnified manner or displaying the graphic object by applying a specific graphic effect.

As illustrated in (b) and (c) of FIG. 8A, when a touch (e.g., drag touch) continuously applied after a touch applied to any one point (for example, the first point a1) of the touch pad 500 is moved to a different point (e.g., a third point a3), the controller 180 may display a graphic object 800c linked to the different point (e.g., the third point a3) to be visually distinguished from other graphic objects.

When the touch is released, the controller 180 may output an execution screen corresponding to a function linked to the graphic object displayed to be visually distinguished, on the portion 151a' of the flexible display.

For example, as illustrated in (d) of FIG. 8A, when the touch applied to the third point a3 is released, the controller 180 may execute a graphic object (i.e., the graphic object 800c linked to the third point a3) displayed to be visually distinguished. Also, as illustrated in (d) of FIG. 8A, on the basis of the release of the touch, the controller 180 may output an execution screen 810c corresponding to a function linked to the graphic object 800c displayed to be visually distinguished, on a portion 151a' of the flexible display.

The touch illustrated in (a) to (d) of FIG. 8A should be understood as a single touch operation (or a continuous touch operation) applied to the touch panel 500. In other words, when a touch is applied to the touch pad 500 as illustrated in (a) of FIG. 8A, the controller 180 may set a plurality of points linked to a plurality of graphic objects with respect to a point to which the touch is applied. Also, the controller 180 may display the graphic object 800a linked to the point to which the touch is applied, such that the graphic object 800a is visually distinguished.

As illustrated in (b) of FIG. 8A, when a drag touch is applied continuously after the touch (in other words, when the touch applied in (a) of FIG. 8A is not released and the drag touch is applied continuously), the controller 180 may display the graphic object linked to the point to which the drag touch is applied (or a point where the drag touch is positioned) to be visually distinguished.

When the drag touch is released, the controller 180 may output an execution screen of a function linked to the graphic object displayed to be visually distinguished on the portion 151a' of the flexible display.

Through such a configuration, the present disclosure may provide a new control method and a user interface capable of simply selecting and executing a graphic object output on a portion of the flexible display using the touch pad in a state in which the main body is folded may be provided.

The plurality of points linked to the plurality of graphic objects may be set based on a point at which a touch is first applied to the touch pad. That is, the controller 180 may set a plurality of points linked to the plurality of graphic objects at different positions according to the point at which a first touch is applied to the touch pad.

Figure 8B:
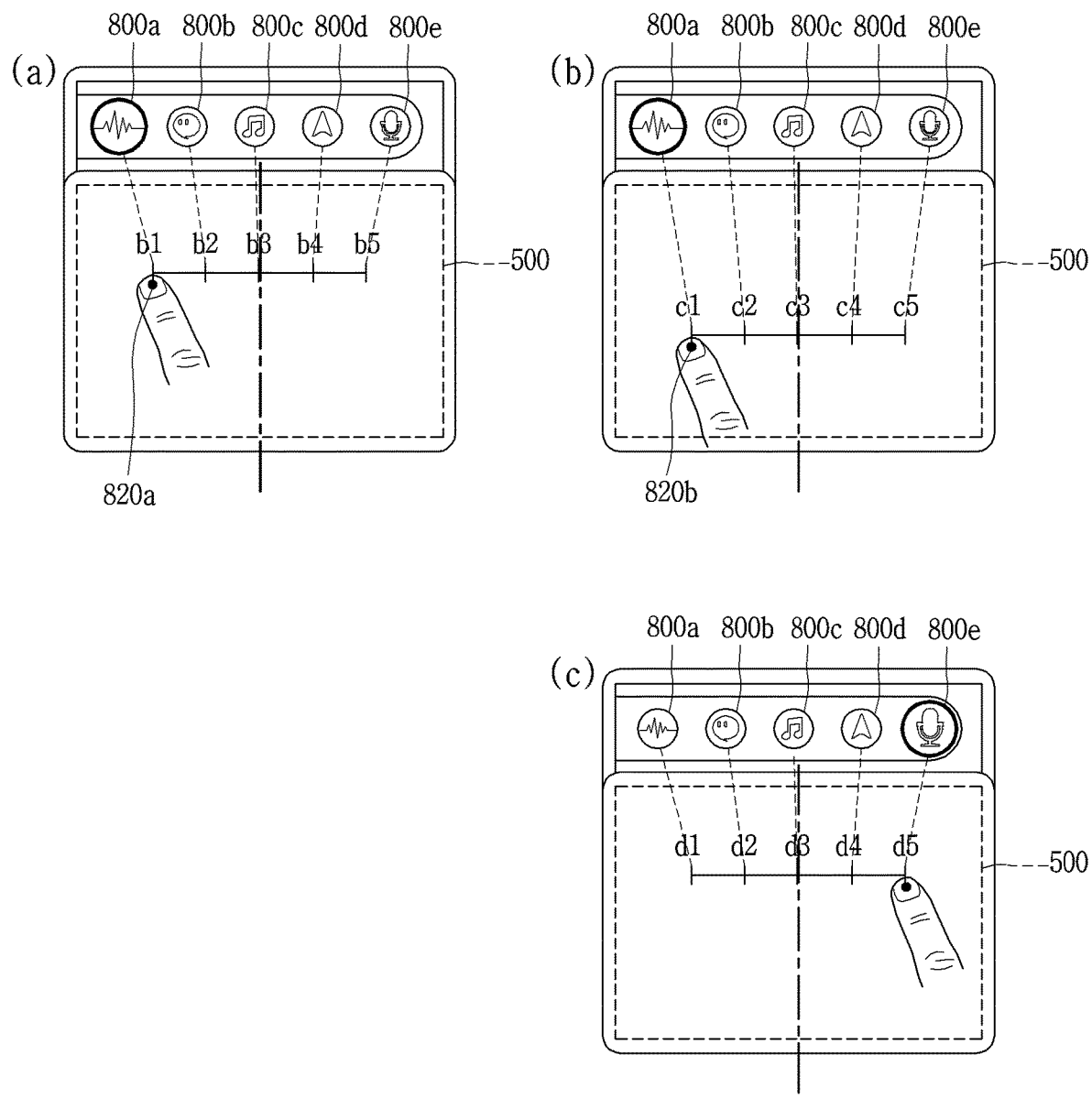

For example, when a touch is applied to one point 820a of the touch pad 500 as illustrated in (a) of FIG. 8B, the controller 180 may set a plurality of points b1, b2, b3, b4, and b5 linked to a plurality of graphic objects 800a, 800b, 800c, 800d, and 800e with respect to the one point 820a. Also, when a touch is applied to another point 820b as illustrated in (b) of FIG. 8B, the controller 180 may set a plurality of points (for example, c1, c2, c3, c4, and c5) linked to the plurality of graphic objects 800a, 800b, 800c, 800d, and 800e with respect to the other point 820b.

Meanwhile, the controller 180 may set different graphic objects which are visually distinguished from each other according to a region at which a touch is first applied on the touch pad 500.

For example, assuming that the touch pad 500 is divided into a left region and a right area, as illustrated in (a) and (b) of FIG. 8B, when a point to which a touch is first applied on the touch pad 500 is the left region, the controller 180 may display the graphic object 800a output on the leftmost, among the plurality of graphic objects, such that the graphic object 800a is visually distinguished.

In another example, when a first touch point on the touch pad 500 is the right region as illustrated in (c) of FIG. 8B, the controller 180 may display the graphic object 800e output on the rightmost, among the plurality of graphic objects, to be visually distinguished. In addition, when the touch is applied to the right region, the controller 180 may set a plurality of points d5, d4, d3, d2, and d1 linked to the plurality of graphic objects 800e, 800d, 800c, 800b, and 800a in reverse order with respect to the point d5 at which the touch is applied.

Figure 8C:
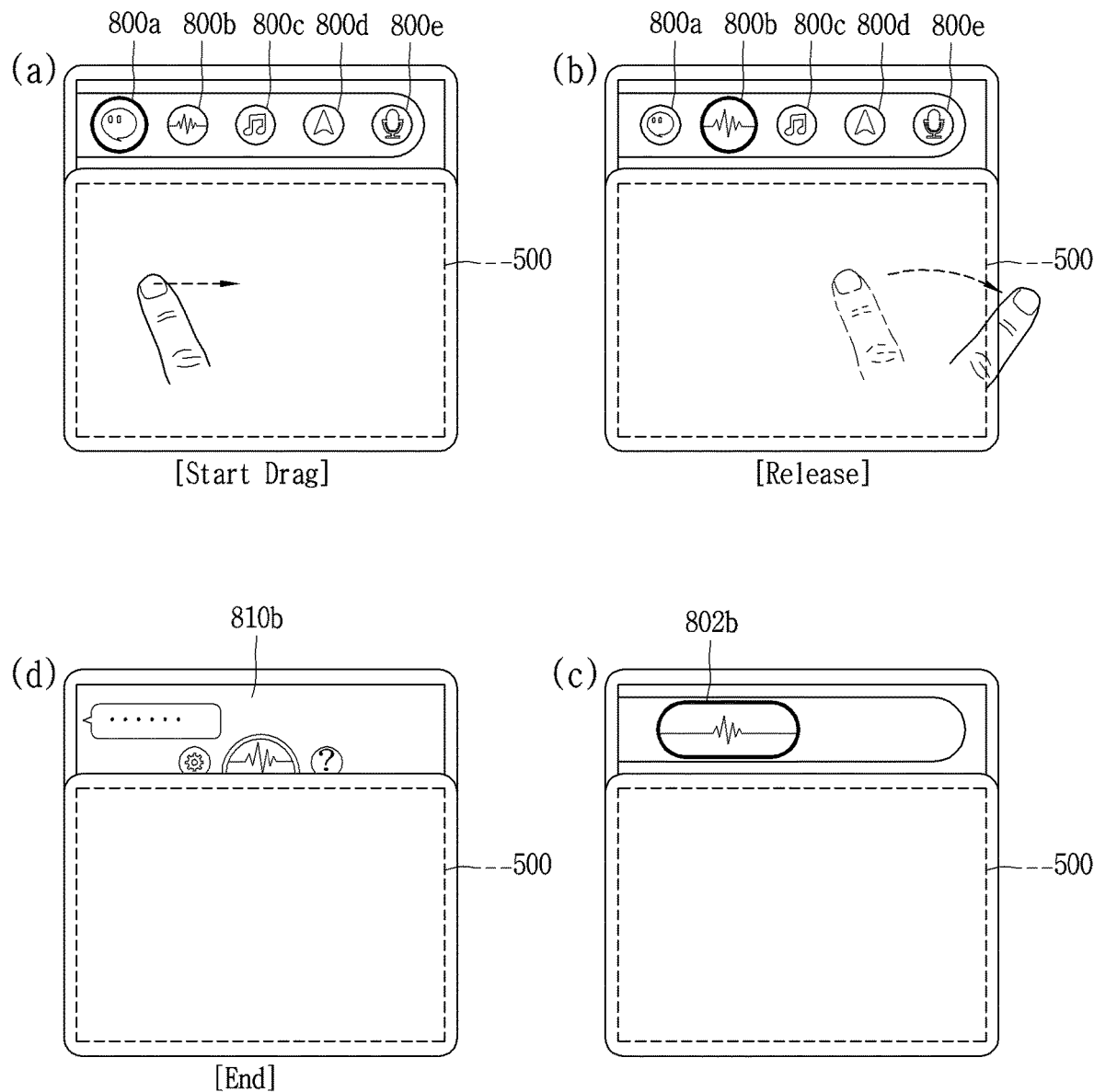

FIG. 8C is a diagram for explaining a process of outputting an execution screen corresponding to a function linked to a visually distinguished graphic object, that is, an execution screen of a function linked to a graphic object, when a touch is released from the touch pad.

As illustrated in (a) of FIG. 8C, when a touch is applied in a state in which the main body is folded and a plurality of graphic objects are output on a portion 151a' of the flexible display exposed to the outside, the controller 180 may display the graphic object 800a linked to the touched point such that the graphic object 800a is visually distinguished from other graphic objects.

Thereafter, when a drag touch is applied continuously after the touch, the controller 180 may display the graphic object 800b linked to the point to which the drag touch is applied, such that the graphic object 800b is visually distinguished from other graphic objects as illustrated in (b) of FIG. 8C.

Thereafter, when the drag touch is released, the controller 180 may deform (e.g., extend) the graphic object 800b which is displayed to be visually distinguished as illustrated in (c) of FIG. 8C. Here, the extending graphic object 802b illustrated in (c) of FIG. 8C may be understood as an example of an animation effect.

Thereafter, as illustrated in (d) of FIG. 8C, the controller 180 may output an execution screen 810b of a function linked to the graphic object 800b displayed to be visually distinguished on a portion 151a' of the flexible display exposed to the outside.

The contents described above with reference to FIGS. 8A to 8C may also be inferred and applied in the same or similar manner even in a state in which an execution screen of a specific function is output on the portion 151a' of the flexible display.

Figure 9A:
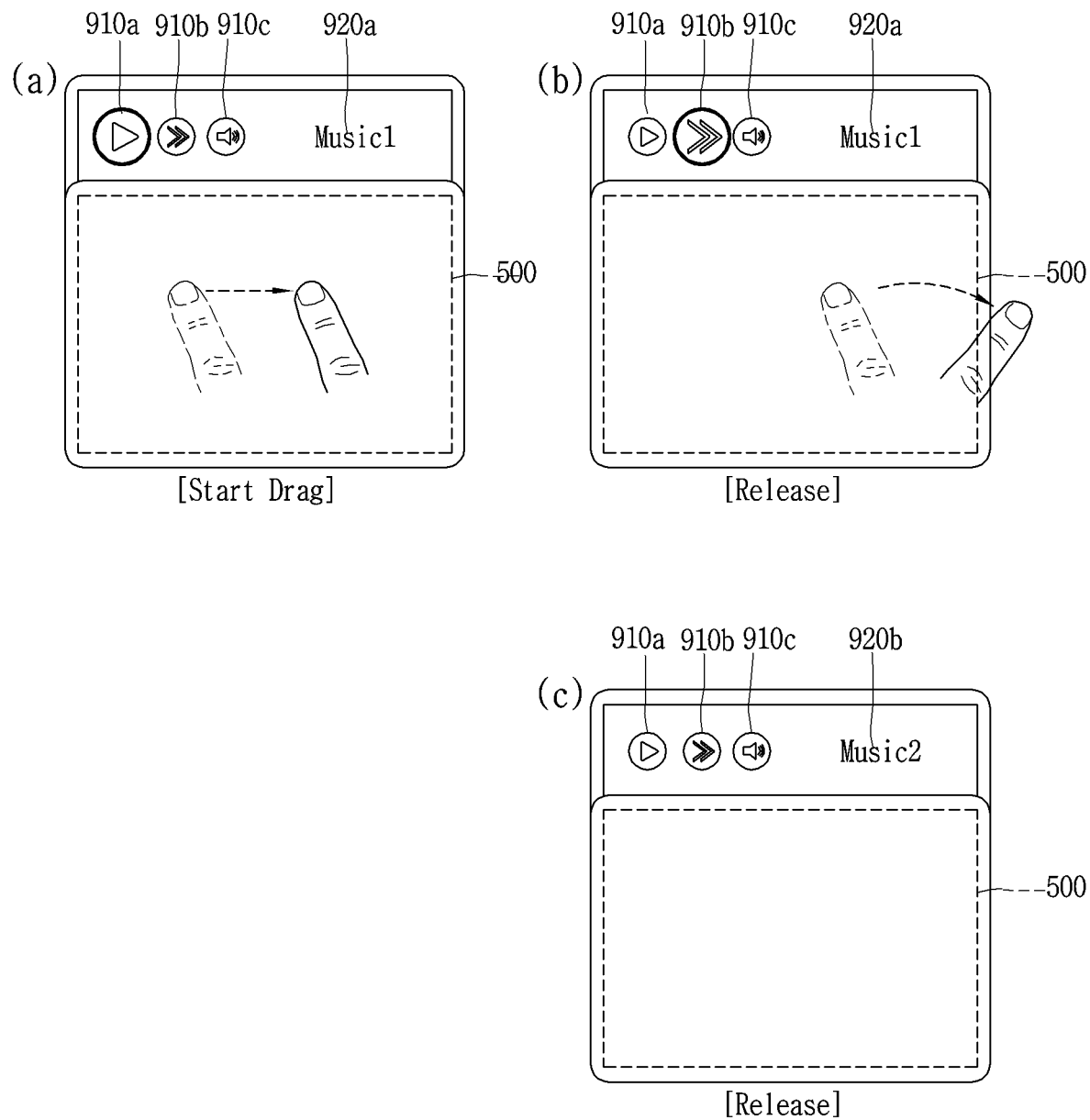

For example, FIG. 9A shows an embodiment in which an execution screen of a music-related application is output on a portion 151a' of the flexible display exposed to the outside in a state in which the main body is folded.

As illustrated in (a) of FIG. 9A, an execution screen 900 of the music-related application may include various graphic objects. For example, a graphic object 910a linked to a function of playing/stopping content (e.g., music data), a graphic object 910b linked to a function of playing back (selecting) next/previous content, a graphic object 910c linked to a volume control function, and information (e.g., content title, artist name, album name, etc.) 920a linked to currently selected content may be displayed on the execution screen 900.

In a state in which the main body is folded and the execution screen 900 is output on a portion 151a' of the flexible display exposed to the outside, when a touch is applied to the touch pad 500 disposed on the rear side of the main body to face in the same direction as the one portion in the state in which the main body is folded, the controller 180 may display any one 910a, among a plurality of graphic objects included in the execution screen, to be visually distinguished from the other remaining graphic objects as illustrated in (a) of FIG. 9A. Thereafter, when a drag touch is applied continuously after the touch, the controller 180 may display a graphic object 910b different from the any one graphic object 910a such that the graphic object 910b is visually distinguished as illustrated in (b) of FIG. 9A.

Thereafter, when the drag touch is released, the controller 180 may execute a function linked to the other graphic object 910b displayed to be visually distinguished, as illustrated in (c) of FIG. 9A.

For example, if the function linked to the graphic object 910b is a function of playing back (selecting) next content, the controller 180 may play back (select) next content 920b as illustrated in (c) of FIG. 9A.

Figure 9B:
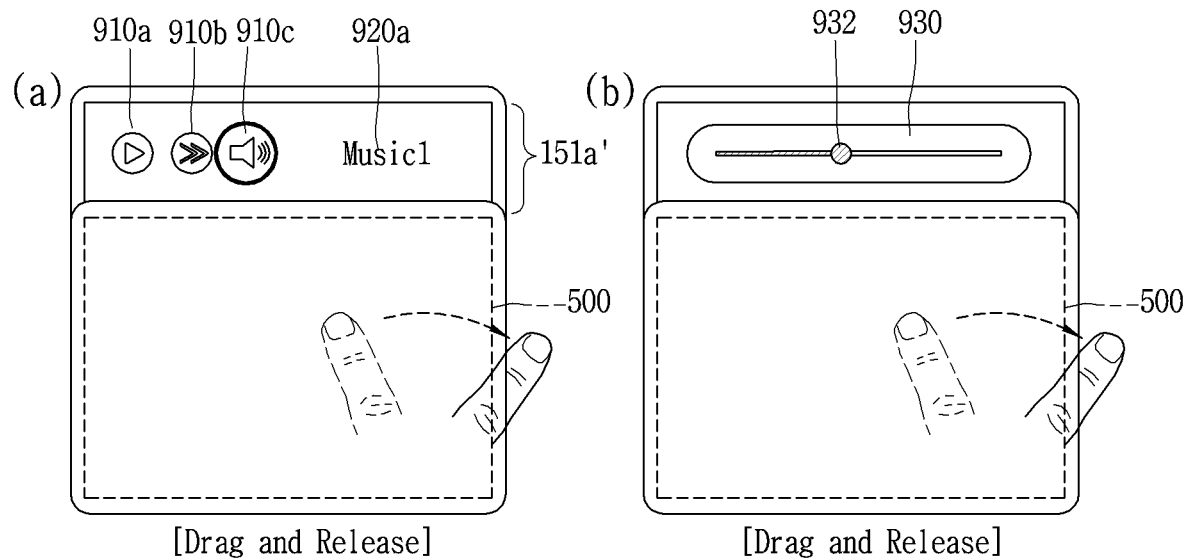
Figure 9B:
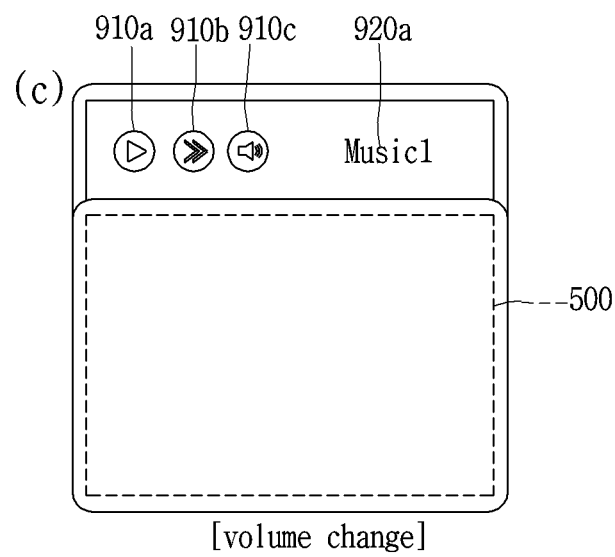

As illustrated in (a) of FIG. 9B, after a drag touch is applied continuously after a touch is applied to the touch pad 500, if a graphic object displayed to be visually distinguished when the drag touch is released is a graphic object 910c linked to a volume control function is a graphic object 910c, the controller 180 may output an execution screen 930 of the volume control function on the portion 151a' of the flexible display as illustrated in (b) of FIG. 9B.

In this state, when a new drag touch is applied to the touch pad 500, the controller 180 may adjust the volume depending on the new drag touch. Here, the controller 180 may move an indicator 932 displayed on the execution screen 930 of the volume control function depending on the new drag touch.

Thereafter, when the new drag touch is released from the touch pad 500, the controller 180 may adjust the volume and cause the execution screen of the volume control function 930 to disappear from the portion 151a' of the flexible display as illustrated in (c) of FIG. 9B. In this case, the execution screen of the music-related application may be displayed again on the portion 151a' of the flexible display.

The execution screen 930 of the volume control function may disappear based on whether the new drag touch is released from the touch pad 500, may disappear based on another new touch applied to the touch pad 500, or may disappear based on that a touch is not applied to the touch pad (or a portion of the flexible display) for a certain period of time.

Figure 10:
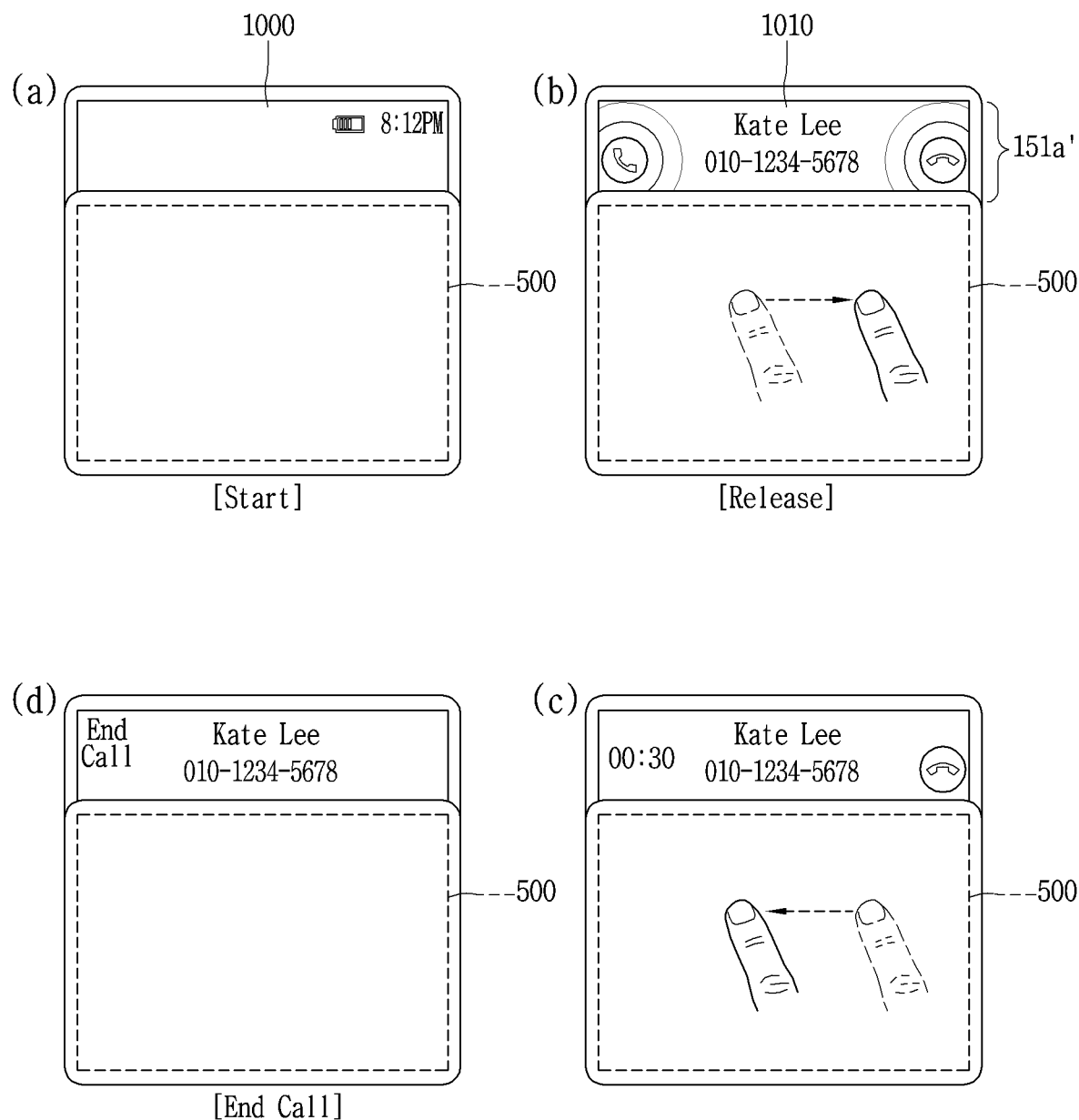

FIG. 10 shows an embodiment in which when a call signal is received in a state in which the main body is folded, a call is connected using the touch pad or reception of the call signal is terminated.

As illustrated in FIG. 10 (a), in a state in which the main body is folded, certain screen information 1000 may be output on the portion 151a' of the flexible display exposed to the outside. The certain screen information may be, for example, a status bar, a home screen page, a lock screen, or the like. However, the present disclosure is not limited thereto, and the portion 151a' of the flexible display exposed to the outside in a state in which the main body is folded may be in an inactive state.

When a call signal is received through the wireless communication unit in a state in which the main body is folded, the controller 180 may output screen information 1010 indicating that the call signal is being received on the portion 151' of the flexible display exposed to the outside.

When a preset type of touch is applied to the touch pad 500 disposed to face in the same direction as the one portion of the flexible display exposed to the outside in a state in which the screen information 1010 is output, the controller 180 may perform a function linked to the preset type of touch.

For example, as illustrated in (b) FIG. 10, when a drag touch is applied in a first direction (e.g., rightward direction) in a state in which the screen information 1010 is output, the controller 180 may connect a call corresponding to the call signal.

Here, in order to more easily receive the user's voice in a folded state of the main body, the microphone related to the present disclosure may be provided in the portion (e.g., a virtual line or a bent region) where the main body is folded or the periphery.

Although not shown, when a drag touch is applied in a second direction (for example, a leftward direction) opposite to the first direction in a state in which the screen information 1010 is output, reception of the call signal may be terminated.

Meanwhile, as illustrated in (c) of FIG. 10, if a drag touch is applied to the touch pad 500 in one direction (for example, the second direction) in a state in which a call is connected, the terminal 180 may terminate the connected call, as illustrated in (d) of FIG. 10.

Through the configuration, in the present disclosure, the user interface capable of easily controlling an execution screen of a specific function using the touch pad provided on the rear surface of the main body which is oriented in the same direction as one portion of the flexible display exposed to the outside in a state in which the main body is folded, and connecting or terminating a call more conveniently may be provided.

Meanwhile, the mobile terminal related to the present disclosure may perform a function related to payment in a simplified manner in a state in which the main body is folded.

Figure 11A:
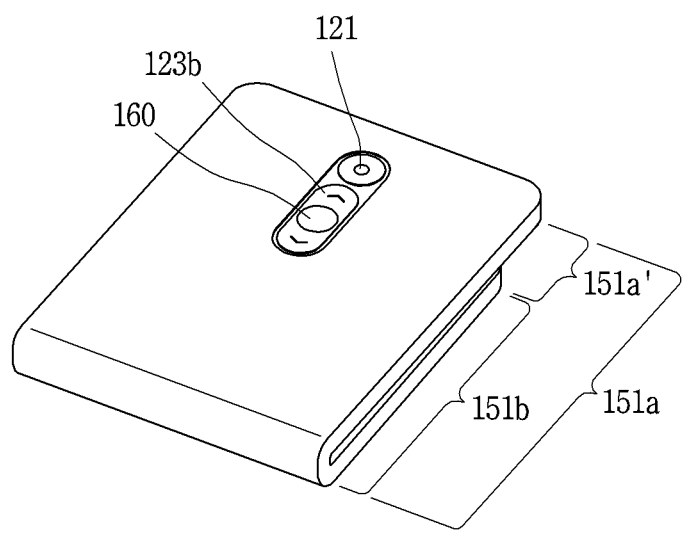

As illustrated in FIG. 11A, at least one of the home button 160, the second user input unit 123*b*, and the camera 121 may be provided on the rear surface of the main body of the mobile terminal according to the present disclosure. The home button 160, the second user input unit 123*b*, and the camera 121 may be provided on the rear surface of the first body portion having a larger size, among the first body portion and the second body portion of the main body, for example.

Meanwhile, a fingerprint recognition sensor may overlap the home button 160. Specifically, the home button 160 and the fingerprint recognition sensor may be interlayered or may be integrally formed. The controller 180 may perform fingerprint recognition on a fingerprint of a finger that applies pressure to the home button or that touches the home button using the fingerprint recognition sensor. The method of performing fingerprint recognition is an obvious technique, and thus, a detailed description thereof will be omitted.

Figure 11B:
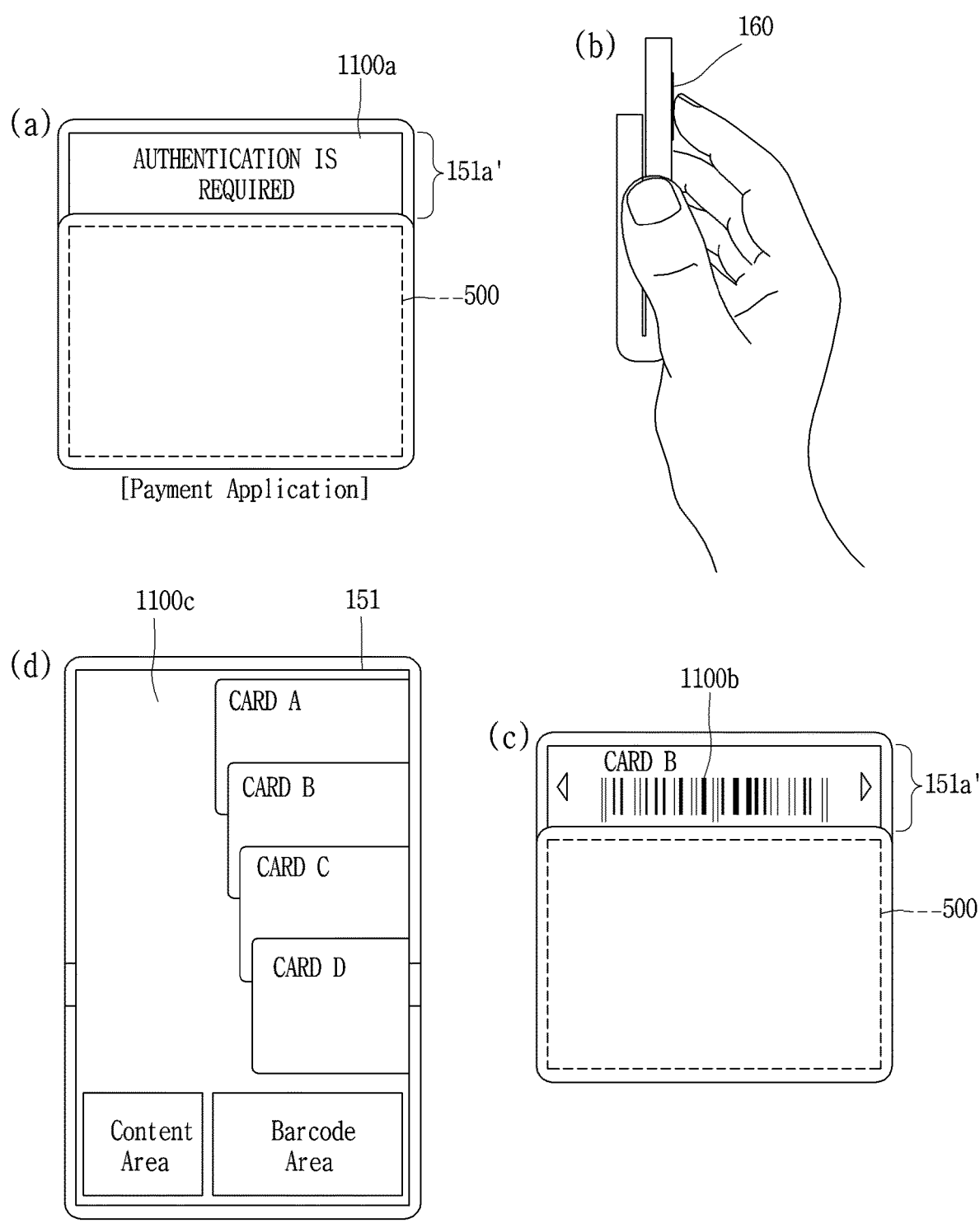

When a payment related application is executed in a state in which the main body is folded, as illustrated in (a) of FIG. 11B, an execution screen 1100*a* of the payment-related application may be output on the one portion 151*a*' of the flexible display exposed to the outside. The execution screen 1100*a* of the payment-related application may be, for example, screen information indicating that user authentication is required.

In a state in which the execution screen 1100*a* is output on the portion 151*a*' of the flexible display, as illustrated in (b) of FIG. 11B, the controller 180 may perform fingerprint recognition on the fingerprint formed on the finger touching the home button 160 using the fingerprint recognition sensor.

As illustrated in (b) of FIG. 11B, when fingerprint recognition of a fingerprint of the finger which touches the home button using the fingerprint recognition sensor is successful in a state in which the main body is folded, as illustrated in (c) of FIG. 11B, an image 1100*b* related to payment (e.g., a first image related to payment) related to payment may be output on the portion 151*a*' of the flexible display.

The image related to payment may be, for example, a barcode image, a QR code image, an image related to a payment unit (for example, a card image), and the like. The image related to payment may be an image related to payment registered in advance by a user setting.

The first image related to payment may be, for example, an image set as a default among images related to payment registered in advance.

When the main body folded by the external force is unfolded (or when the flexible display is unfolded) in a state in which the image 1100*b* related to payment is output on the portion 151*a*' of the flexible display, as illustrated in (d) of FIG. 11B, the controller 180 may output screen information related to payment on the entire area of the flexible display 151. Here, unfolding the folded body may refer to at least one of unfolding the main body to a flat state and unfolding the main body such that the main body is bent to have a radius of curvature larger than a preset radius of curvature.

Screen information 1100*c* related to payment may be an execution screen that is set to be output when the fingerprint recognition is successful among execution screens of a payment-related application. The screen information related to payment may include information (or an image) related to a previously registered payment unit, an image related to payment, and various information related to payment.

Meanwhile, the mobile terminal according to the present disclosure may perform two or more operations of executing the payment-related application using a single control command (touch, contact, or pressing) applied to the home button and performing fingerprint recognition.

Figure 11C:
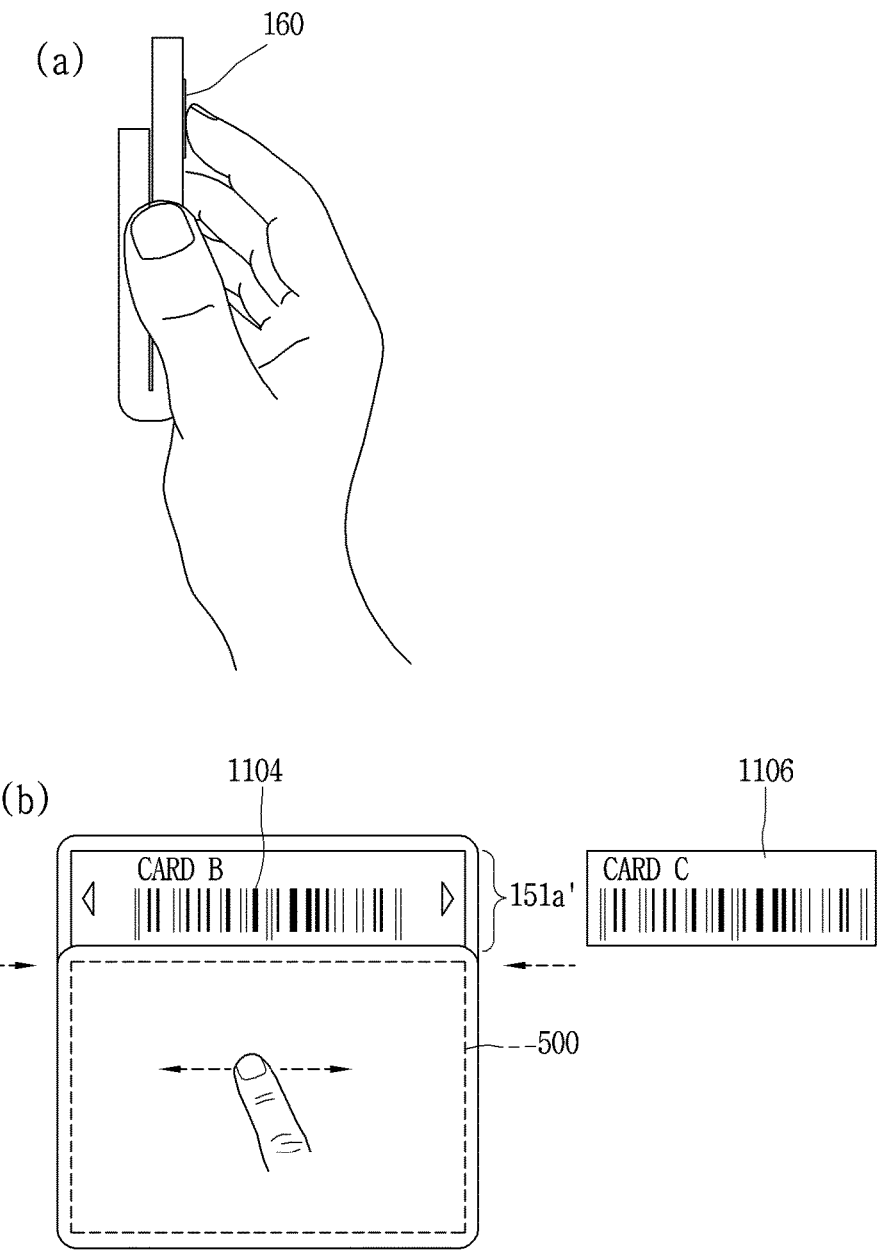

For example, as illustrated in (a) of FIG. 11C, when the home button is pressed (touched or contacted) in a state in which the main body is folded and a portion of the flexible display is inactive (or in a state in which a status bar is displayed), the controller 180 may switch the one portion 151*a*' of the flexible display to an active state. Thereafter, if the finger pressing the home button is not released and the contact (or pressurization) is maintained for a predetermined time, the controller 180 may perform fingerprint recognition on the fingerprint formed on the finger in contact with the home button 160 using the fingerprint sensor.

Here, the predetermined time may be a time set by the user or a time including a time required for performing fingerprint recognition.

If the fingerprint recognition is successful, the controller 180 may output a first image 1104 related to payment on the portion 151*a*' of the activated flexible display, as illustrated in (b) of FIG. 11C.

That is, when the finger pressing the home button is not released from the home button and is held for a predetermined time, the controller 180 may activate a portion of the flexible display by a single control command and perform fingerprint recognition, and when the fingerprint recognition is successful, the controller may perform at least three operations of outputting an image related to payment on a portion of the flexible display.

In a state in which the first image 1104 related to payment is output on the portion 151*a*' of the flexible display, when a preset type of touch (for example, drag touch) is applied to the touch pad 500 provided on the rear surface of the main body, the controller 180 may switch the output first image 1104 to a second image 1102 or 1106 related to payment.

Here, the type of the second image related to payment may be determined based on the direction in which the drag touch is applied.

For example, when a drag touch is applied to the touch pad 500 in the first direction (for example, rightward direction) in a state in which the first image related to payment is output on a portion of the flexible display, the second image 1102 related to payment may be output on the portion 151*a*' of the flexible display.

In another example, in a state in which the first image related to payment is output on a portion of the flexible display, when a drag touch is applied to the touch pad 500 in the second direction (for example, leftward direction) different from the first direction, a second image 1106 related to payment may be output on the portion 151*a*' of the flexible display.

If the image related to payment is a barcode image or a QR code image, the user may perform payment by bringing a reader close to the image related to payment.

Meanwhile, if the image related to payment is an image related to a payment unit (for example, a card, a credit card, etc.), the controller 180 may transmit information related to the payment unit through the wireless communication unit 110.

Here, in a state in which the image related to payment is output on the portion 151*a*' of the flexible display, if additional fingerprint through the home button is successful, the controller 180 may transmit the payment unit information through the wireless communication unit 110.

The payment unit information may include information related to a card (card information), information related to the mobile terminal 100 (mobile terminal information), and the like. Information related to a card (card information) may include a card number, an expiration date, a CVC number, user information (e.g., name, resident registration number, telephone number), and the like. The information related to the mobile terminal 100 (mobile terminal information) may include user information (e.g., name, resident registration number, telephone number), and the like.

A point-of-sale (POS) terminal located close to the mobile terminal (or located within a region in which wireless communication with the mobile terminal may be performed) may receive the payment unit information from the mobile terminal. When the payment unit information is received, the POS terminal may perform payment using the received information.

Here, the mobile terminal related to the present disclosure may transmit the payment unit information using at least one of near field communication (NFC) technology and magnetic secure transmission (MST) technology.

At least one of the NFC technology and the MST technology may be applied to the wireless communication unit 110 to transmit the payment unit information to the POS terminal by the NFC method and/or the MST method.

The MST technique may be a technique of generating a magnetic field, which is the same as a magnetic field generated when a card having a magnet (e.g., a magnetic card, a magnetic credit card) is connected to (or contact, swipe) the POS terminal (e.g., a magnetic payment terminal) having a magnetic reader part, in the mobile terminal (e.g., the wireless communication unit 110, the short-range communication module 114) and wirelessly transmitting payment unit information (e.g., information related to the card) to the POS terminal.

The NFC method may be used to wirelessly transmit payment unit information to the POS terminal when the POS terminal has an NFC module (or NFC chip). Meanwhile, in the MST system, if a magnetic reader is present in the POS terminal 200, payment unit information may be wirelessly transmitted to the POS terminal although a separate NFC module is not provided.

The MST technique (or the MST scheme) applicable in the present disclosure may be implemented in (applied to) the wireless communication unit 110 and the short-range communication module 114 or may be implemented in a separate MST module (e.g., a loop antenna) to which the MST technology is applied (in the present disclosure, a case where the MST technology may be implemented in the short-range communication module 114 will be described as an example, for convenience of explanation).

In the above description, the case where the fingerprint recognition sensor is provided on the home button has been described, but the present disclosure is not limited thereto. For example, the fingerprint sensor may have an interlayer structure with the touch pad 500 or may be integrally formed. That is, the controller 180 may perform fingerprint recognition of the fingerprint of the finger in contact with the touchpad using the fingerprint recognition sensor formed in at least a portion of the touchpad in an overlapping manner.

The contents described above with reference to FIGS. 11A to 11C may be inferred/applied in the same or similar manner even when a control command (touch, contact, pressure) is applied to the touch pad 500 in a state in which the main body is folded.

Through this configuration, the present disclosure may perform the payment function in an optimized manner using the home button or the touch pad provided on the rear surface of the main body in a state in which the main body is folded.

Meanwhile, the mobile terminal related to the present disclosure may perform various functions using the touch pad provided on the rear surface of the main body so as to face in the same direction as that of a portion of the flexible display exposed to the outside in a folded state of the main body.

Figure 12:
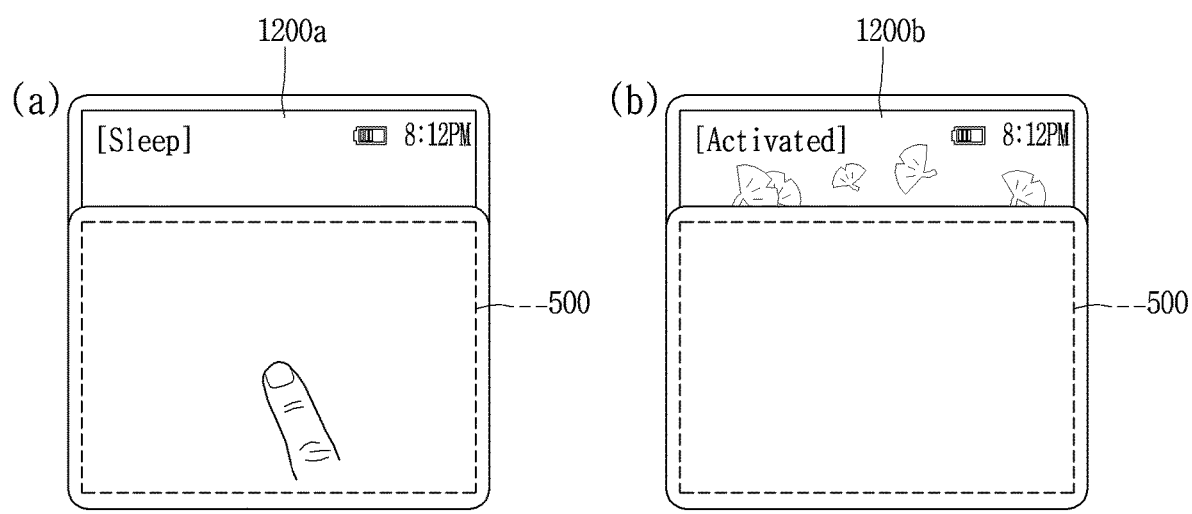

For example, as illustrated in (a) of FIG. 12, the controller 180 may enter the first mode when a predetermined time has elapsed (or has passed) in a state in which the main body is folded. The first mode may be, for example, any one of a standby mode, a power saving mode, or a sleep mode. The first mode may be an inactive mode in which a portion of the flexible display is turned off.

In the first mode, for example, only a minimum amount of information 1200 which consumes less power such as remaining battery capacity information and time information may be displayed.

When a preset type of touch is applied to the touch pad 500 in the first mode, the controller 180 may enter the second mode different from the first mode as illustrated in (b) of FIG. 12.

The second mode may be, for example, an active mode. When the controller 180 enters the second mode, screen information 1200*b* may be displayed on a portion of the flexible display exposed to the outside. For example, the screen information 1200*b* may be at least one of a lock screen, a home screen page, and an execution screen of an application that was executing before entering the first mode.

Various types of touches described above may be applied to the preset type of touch for entering the second mode. For example, the controller 180 may enter the second mode different from the first mode when a short touch, a long touch, or a double touch that at least two touches are applied within a predetermined time is applied.

Meanwhile, in a state in which the controller 180 enters the first mode or the second mode, when a force touch applied at a predetermined pressure or greater is applied to the touch pad 500, the controller 180 may activate the camera 121 and enter a camera mode.

For example, when the force touch is applied to the touch pad 500, the controller 180 may activate the camera and capture a preview image received through the activated camera. The preview image may be captured immediately on the basis of the force touch, or may be captured based on the lapse of a predetermined time through a timer function. Here, the controller 180 may set the predetermined time to be different according to pressure of the applied force touch.

For example, when a force touch is applied with first pressure to the touch pad, the controller 180 may capture the preview image based on the passage of a first time. As another example, when a force touch is applied with second pressure different from the first pressure to the touch pad, the controller 180 may capture the preview image based on the elapse of a second time different from the first time.

Alternatively, when the force touch is applied to the touch pad 500, the controller 180 may activate the camera 121 and output the preview image received through the camera on one portion 151a' of the flexible display exposed to the outside. Thereafter, the controller 180 may capture the preview image based on whether a touch is applied to the touch pad 500, the portion 151a' of the flexible display, or the preview image.

The controller 180 may store the captured image in the memory 170.

Through this configuration, the present disclosure may provide the user interface capable of easily switching a portion of the flexible display to an active state in a state in which the main body is folded, or entering the camera mode in a simple manner to perform an image capture function.

Meanwhile, in the present disclosure, various functions may be performed not only when the main body is in the folded state but also when the main body is in a flat state by using the touch pad provided on the rear surface of the main body. Hereinafter, various functions performed using the touch pad in a state in which the main body is flat will be described in more detail with reference to the accompanying drawings.

FIGS. 13, 14, 15, 16, 17, 18, and 19 are conceptual views illustrating an embodiment of the present disclosure in which the flexible display is controlled using the touch pad provided on the rear surface of the main body in a state in which the flexible display related to the present disclosure is flat.

The contents described hereinafter may be inferred and applied in the same or similar manner to a state in which the main body (or the flexible display) is bent to have a radius of curvature greater than a preset radius of curvature, as well as to a state in which the main body (or the flexible display) is flat to have an infinite radius of curvature.

That is, the contents described hereinafter in the state in which the main body is flat may also be inferred and applied in the same or similar manner even in a state in which the main body is bent (bent state, rather than a folded state) to have a radius of curvature greater than the preset radius of curvature.

Figure 13:
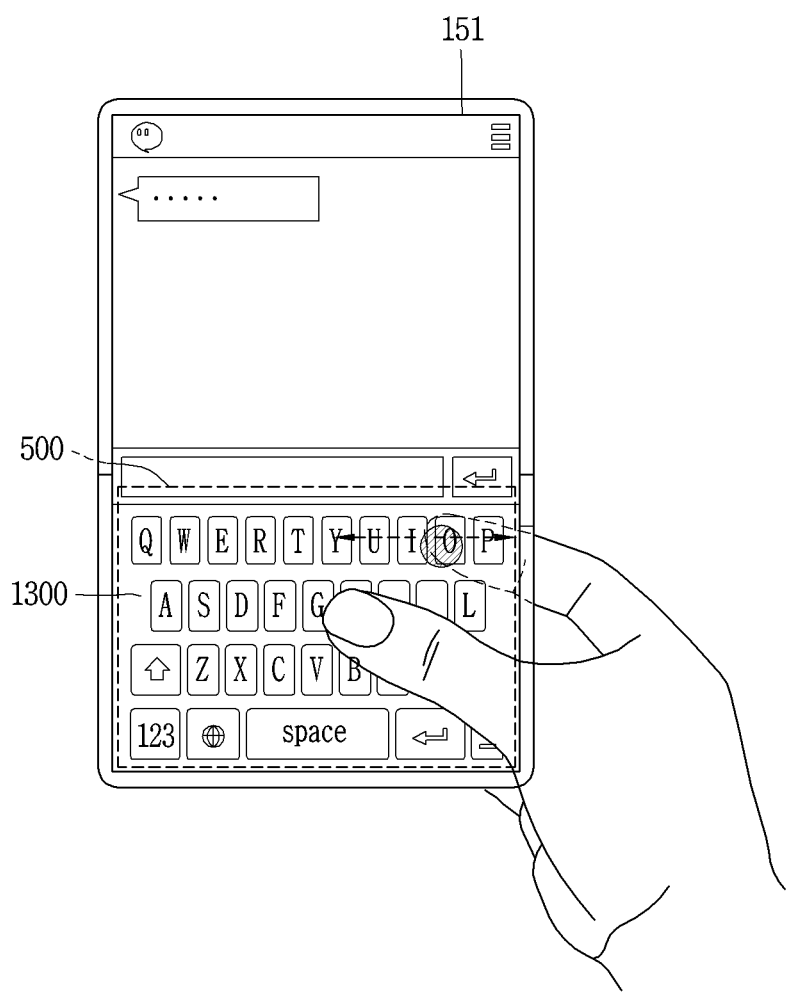
FIG. 13, FIG. 14, FIG. 15, FIG. 16, FIG. 17, FIG. 18, and FIG. 19 are conceptual views illustrating a method for controlling a flexible display using a touch pad provided on the rear surface of the main body in a state in which the flexible display according to the present disclosure is flat.

As illustrated in FIG. 13, the controller 180 may output first screen information 1300 on the flexible display 151 in a state in which the main body is flat. The first screen information may include all kinds of screen information that may be output on the flexible display 151 by the mobile terminal. For example, the first screen information may include a home screen page, an application execution screen, a setting screen, a menu screen, and the like.

When a preset type of touch is applied to the touch pad 500 provided on the rear surface of the main body in a state in which the main body is flat, the controller 180 may switch the first screen information 1300 displayed on the flexible display 151 to second screen information 1300 different from the first screen information.

For example, the preset type of touch may be a drag touch applied in one direction.

When a drag touch is applied in one direction in a state in which the first screen information 1300 is output, the controller 180 may output the second screen information different from the first screen information on the flexible display 151.

Alternatively, when a preset type of touch is applied to the touch pad in a state in which a first keypad is output, the controller 180 may switch the first keypad to a second keypad different from the first keypad. For example, in case where the first keypad is an English keypad, the second keypad may be a Hangul key pad (or Korean keypad).

With this configuration, in the present disclosure, screen switching may be smoothly performed using the touch pad provided on the rear surface of the main body in a flat state (or in a slightly bent state).

The controller 180 may capture screen information output on the flexible display 151 if a touch is maintained for a predetermined period of time on the flexible display 151 and on the touch pad while the main body is flat.

Figure 14:
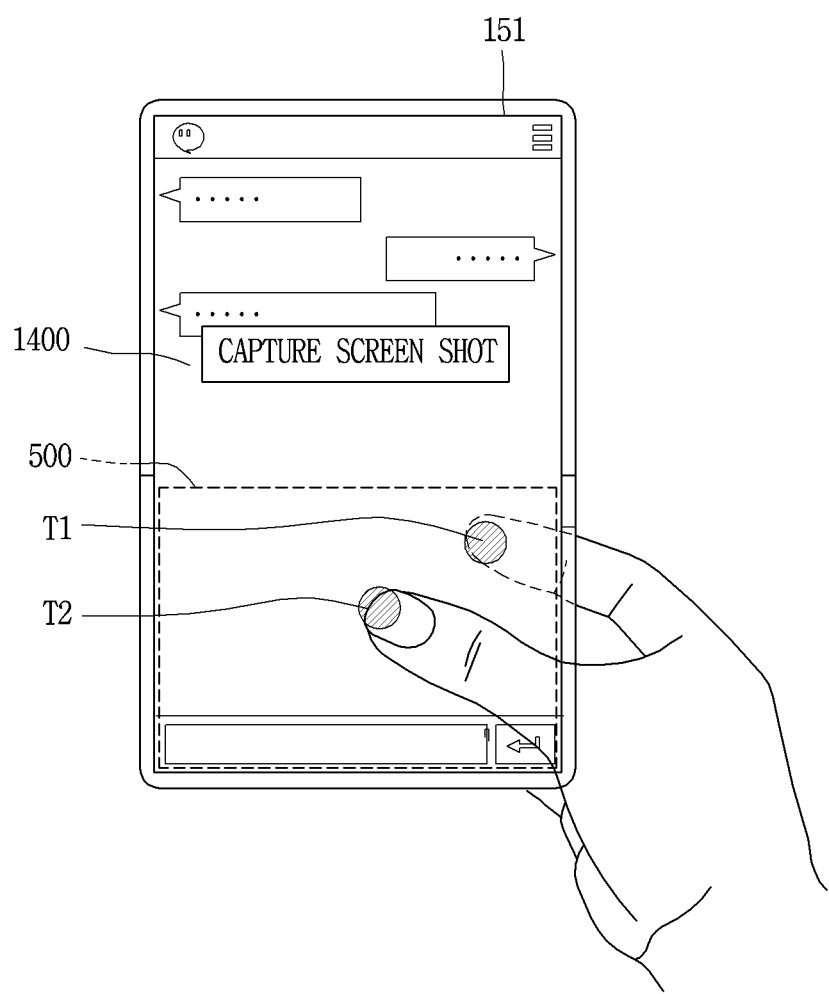

For example, as illustrated in FIG. 14, in a state in which screen information 1400 is output on the flexible display 151, when touches T1 and T2 are simultaneously applied to at least one point on the flexible display 151 and at least one point on the touch pad 500 provided on the rear surface of the main body, the controller 180 may capture the screen information 1400 being output. The controller 180 may store the captured screen information in the memory 170.

Here, when touches are applied together on at least two points on the flexible display 151 and at least two points on the touch pad 500 for a predetermined period of time, the controller 180 may capture the screen information 1400 (in this case, the user may grip the flexible display and the touch pad with both hands).

Regardless of the number of points to which touches are applied on the flexible display 151 and the touch pad 500, when the touch T2 applied to at least one point on the flexible display 151 and the touch T1 applied to at least one point on the touch pad 500 are applied together for a predetermined period of time, the controller 180 may capture the screen information being output on the flexible display 151.

Meanwhile, when a preset type of touch is applied to the touch pad provided on the rear surface in a state in which the main body is flat and the flexible display is inactive, the controller 180 may switch the flexible display from the inactive state to the active state.

Figure 15:
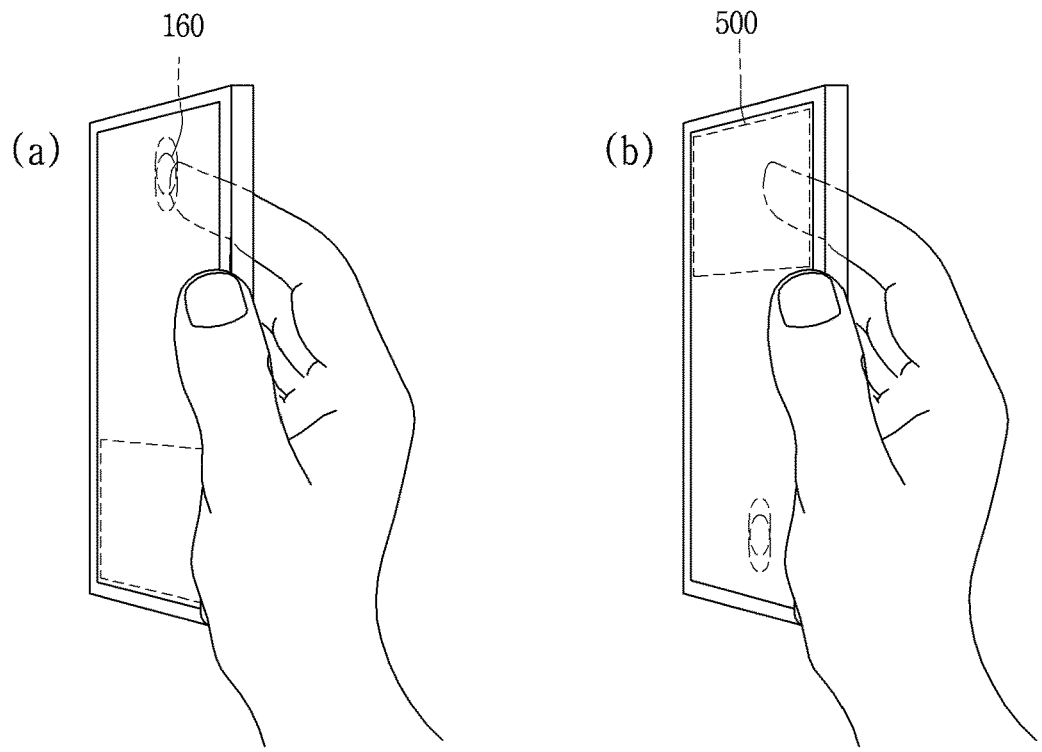

First, as illustrated in (a) of FIG. 15, when the home button 160 provided on the rear surface of the main body is pressed in a state in which the flexible display 151 is flat, the flexible display 151 may be switched from an inactive state to an active state.

Meanwhile, as illustrated in (b) of FIG. 15, it may happen that the user reversely holds the mobile terminal. When a preset type of touch is applied to the touch pad 500 provided on the rear surface in a state in which the main body is flat and the flexible display 151 is inactive, the controller 180 may switch the flexible display from the inactive state to the active state.

The preset type may be any one of the various types of touches described above. For example, the touch may be a double touch that at least two touches are applied within a preset time, or a force touch applied with a predetermined pressure or greater.

Here, in case where the fingerprint recognition sensor overlaps the home button and the touch pad, if the preset type of touch is applied, the controller 180 may perform fingerprint recognition on a fingerprint formed on the finger applying the touch. The fingerprint recognition may be performed based on the fact that contact is maintained for a certain period of time after the preset type of touch is applied.

If the fingerprint recognition is successful, the controller 180 may output an execution screen of an application (for example, a payment related application) set to be executed when the fingerprint recognition is successful, on the flexible display 151.

Figure 16:
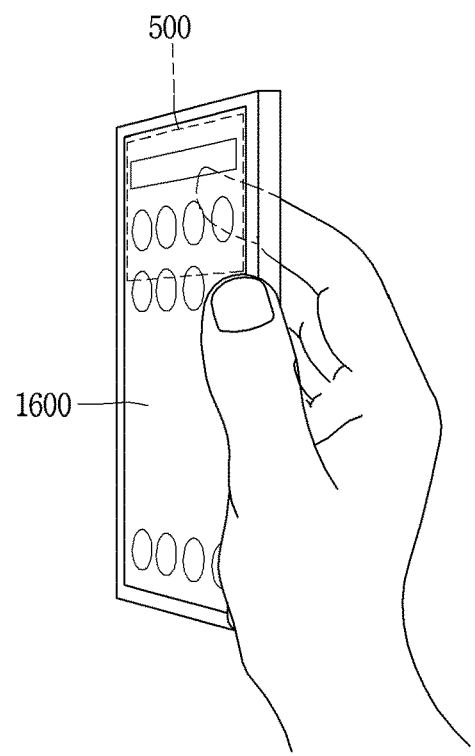

Meanwhile, when a predetermined period of time has elapsed from in a state in which the main body is flat and the flexible display 151 is active, the controller 180 may switch the flexible display from the active state to the inactive state However, as illustrated in FIG. 16, if a touch is applied to the touch pad 500 before the predetermined time has lapsed, the controller 180 may maintain the flexible display in the active state More specifically, in a state in which any screen information 1600 is output (or in the active state) on the flexible display 151, if a touch is not applied for a predetermined period of time on at least one of the flexible display 151 and the touch pad 500, the controller 180 may switch the flexible display 151 to the inactive state.

However, in a state in which the screen information 1600 is output on the flexible display 151, if a touch is applied to at least one of the flexible display 151 and the touch pad 500 before the predetermined period of time has lapsed, the controller 180 may keep outputting the screen information 1600 on the flexible display 151 (that is, maintain the active state).

Meanwhile, the controller 180 may control at least one of the brightness of an output of the flexible display and a volume based on a drag touch applied to the touch pad 500 in a state in which the main body is flat.

Figure 17:
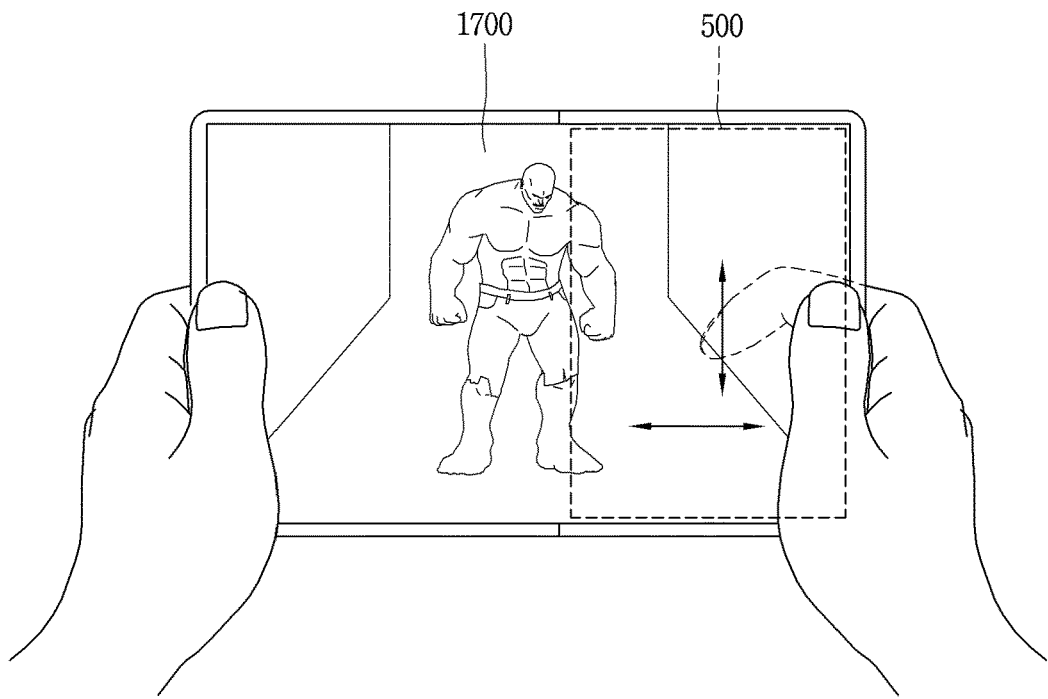

For example, as illustrated in FIG. 17, in a state in which the main body is flat and an image (for example, video) is being output on the flexible display 151, the controller 180 may control at least one of the brightness of an output of the flexible display 151 and the volume of the audio output unit 152.

For example, when a drag touch is applied in the first direction (for example, a horizontal direction) on the touch pad 500, the controller 180 may adjust brightness of an output of the flexible display 151. The controller 180 may control the volume of the audio output unit 152 when a drag touch is applied on the touch pad 500 in the second direction different from the first direction.

Through such a configuration, in the present disclosure, when an image is viewed, brightness of an output or the volume may be adjusted using the touch pad provided on the rear surface of the main body without interfering with the image being output, significantly improving user convenience.

Meanwhile, the mobile terminal according to the present disclosure may include the camera 121 described above with reference to FIGS. 1A to 1C.

Figure 18:
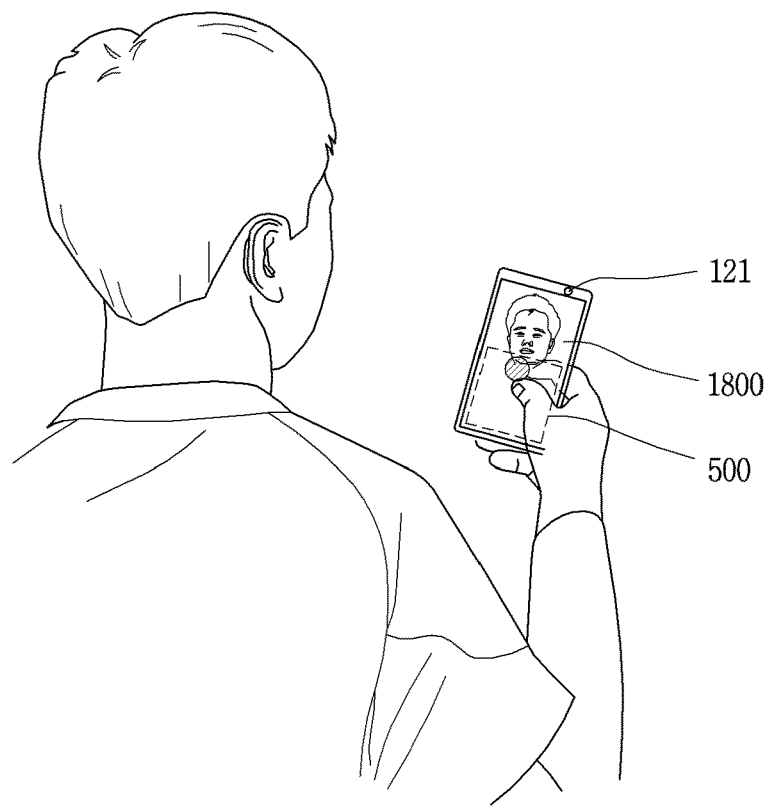

As illustrated in FIG. 18, in a state in which the main body is flat and a preview image 1800 received through the camera 121 is output on the flexible display 151, the preview image 1800 may be captured based on a touch applied to the touch pad 500 provided on the rear surface of the main body. The captured image may be stored in the memory 170.

Meanwhile, the controller 180 may perform various image capture functions using the flexible display and the touch pad.

For example, in a state in which the main body is flat and the preview image is output on the flexible display 151, when a touch is applied to the flexible display, the controller 180 may capture video, and when a touch is applied to the touch pad, the controller 180 may capture a still image.

Alternatively, in a state in which the main body is flat and the preview image is output on the flexible display 151, when a first type of touch is applied to the touch pad 500, the controller 180 may capture the preview image in a first image capture mode (normal image capturing), and when a second type of touch is applied to the touch pad 500, the controller 180 may capture the preview image in a second image capture mode (e.g., panorama mode) different from the first image capture mode. In case where any one of the first and second types of touches is applied to the flexible display 151, the controller may capture the preview image in an image capture mode set to execute when the any one touch is applied to the flexible display 151.

According to the present disclosure, since the preview image can be captured using the touch pad provided on the rear surface of the main body, the image capture function may be performed without covering the flexible display on which the preview image is output, and since an image is captured without changing the position of the hand gripping the mobile terminal, shaking may be prevented.

The mobile terminal according to the present disclosure may output at least two pieces of screen information in an overlapping manner on the flexible display 151 such that they are identified using the touch pad provided on the rear surface of the main body.

Figure 19:
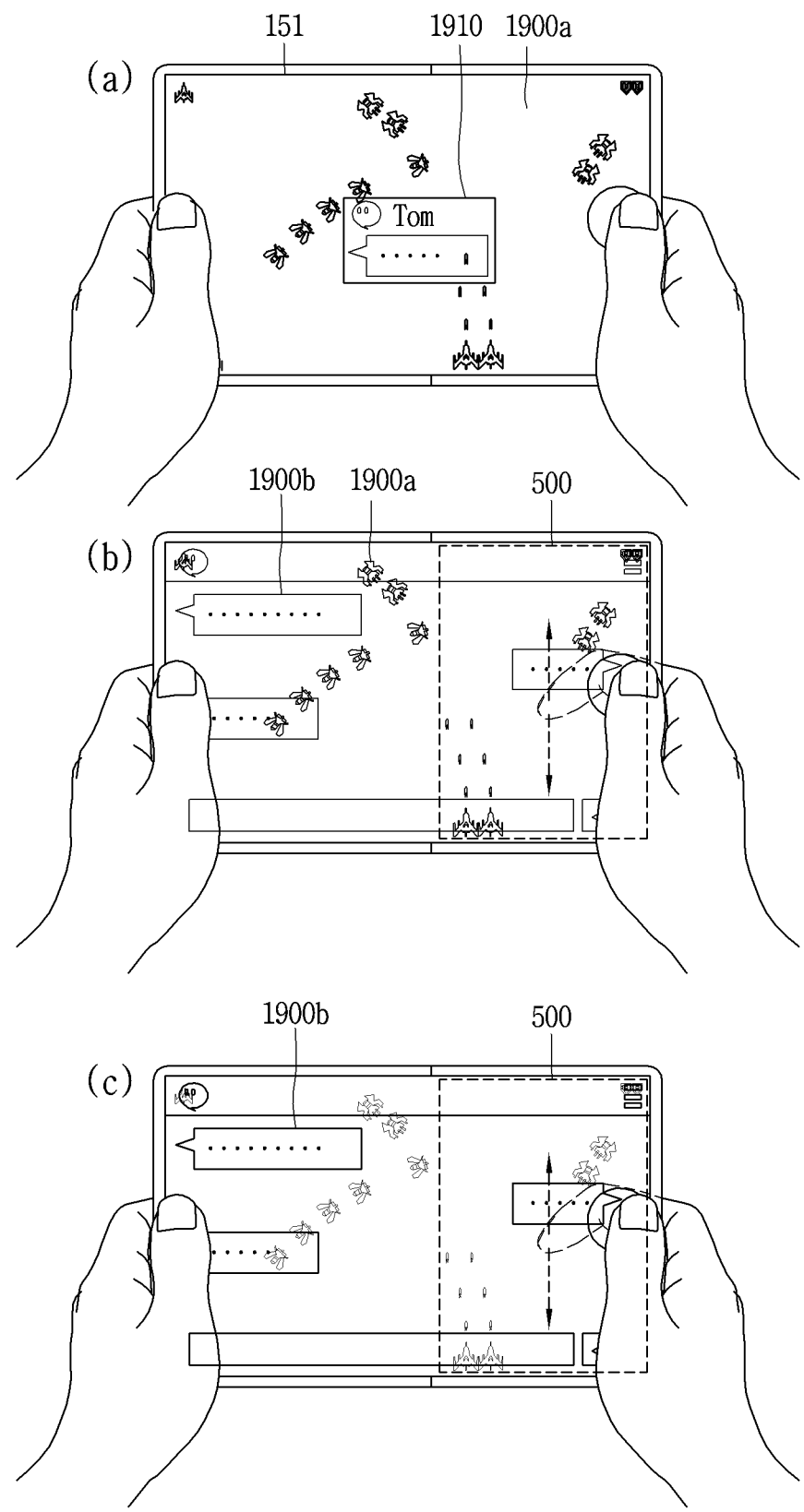

For example, as illustrated in (a) of FIG. 19, first screen information 1900a may be output on the flexible display 151 in a state in which the main body is flat. Here, when an event (for example, reception of notification information, reception of a message, reception of a messenger, etc.) occurs, the controller 180 may display notification information 1910 corresponding to the event on at least a portion of the first screen information 1900a in an overlapping manner. The notification information 1910 may disappear when a predetermined period of time has lapsed. The first screen information 1900a may be an execution screen of an application, for example.

When a preset type of touch is applied to the touch pad 500 provided on the rear surface of the main body after the occurrence of the event, the controller 180 may adjust transparency of the first screen information 1900a and the second screen information 1900b such that at least one of the first screen information 1900a and the second screen information 1900b related to the event may be identified.

The second screen information may be an execution screen of an application in which the event occurs.

In addition, the preset type of touch may be one of the various types of touches described above, and may be, for example, a drag touch applied in one direction.

For example, when a drag touch is applied in one direction of the touch pad in a state in which the notification information 1910 corresponding to the event is output, the controller 180 may display second screen information 1900b related to the event (or the execution screen of the application in which the event occurs) in an overlapping manner on the first screen information 1900a which has been output. In this case, the controller 180 may adjust transparency of the first and second screen information such that both the first screen information 1900a and the second screen information 1900b may be identified.

Here, transparency of the first and second screen information may vary depending on the distance of the drag touch applied to the touch pad 500.

For example, when a drag touch by a first distance is applied to the touch pad 500, the controller 180 may display the first screen information to be clearer than the second screen information as illustrated in (b) of FIG. 19. In this case, the touch input applied to the flexible display 151 may be recognized as a touch input with respect to the first screen information.

As another example, when a drag touch by a second distance longer than the first distance is applied to the touch pad 500, the controller 180 may display the second screen information to be clearer than the first screen information as illustrated in (c) of FIG. 19. In this case, the touch input applied to the flexible display 151 may be recognized as a touch input with respect to the second screen information.

Although not shown, the controller 180 may output on the flexible display 151 an indicator indicating to which screen information a touch input applied to the flexible display is to be recognized as a touch input.

Through such a configuration, in the present disclosure, when an event occurs while the user is executing a certain application, multitasking may be performed such that an execution screen of an application in which the event occurs may be checked together with the execution screen of the certain application, even without having to terminate the execution of the certain application.

Thus, according to the present disclosure, the execution screens of the plurality of applications may be easily switched based on a drag touch applied to the touch pad 500, and the plurality of applications may be simultaneously output on the flexible display and driven without inconveniently performing an operation of terminating the application being currently executed, and thus, user convenience may be significantly increased.

The contents described above with reference to FIGS. 13 to 19 may be inferred and applied in the same or similar manner even to the case of a fixed touch screen (or display), as well as to the case of the flexible display.

Also, in the present disclosure, the case where the touch pad is provided on the rear surface of the main body has been described. However, the present disclosure is not limited thereto and the touch pad may be provided at various positions of the main body (for example, the side surface of the main body). Even when the touch pad is provided on the side surface of the main body, the above-described contents may all be inferred and applied in the same or similar manner.

According to the present disclosure, the new user interface capable of controlling a portion of the flexible display or the flexible display exposed to the outside in an optimized manner using the touch pad provided on the rear surface of the main body in case where the main body is folded or unfolded may be provided.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid-state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal comprising:
    a main body configured such that at least a portion thereof is folded;
    a flexible display provided on a front surface of the main body and configured such that one portion thereof is exposed to the outside in a state in which the main body is folded;
    a touch pad provided on a rear surface of the main body and disposed to face in the same direction as that of the one portion of the flexible display exposed to the outside in a state in which the main body is folded; and
    a controller configured to control the one portion of the flexible display to output screen information linked to a preset type of touch when the preset type of touch is applied to the touch pad in a state in which the main body is folded,
    wherein
    when touches applied to both the flexible display and the touch pad are maintained for a predetermined period of time in a state in which the main body is flat, the controller captures screen information output on the flexible display.

2. The mobile terminal of claim 1, wherein
    different pieces of screen information are output on the one portion of the flexible display according to touch types applied to the touch pad.

3. The mobile terminal of claim 2, wherein
    when a first type of touch is applied to the touch pad, the controller outputs first screen information linked to the first type of touch on the one portion of the flexible display, and
    when a second type of touch different from the first type of touch is applied to the touch pad, the controller outputs second screen information different from the first screen information on the one portion of the flexible display.

4. The mobile terminal of claim 1, wherein
    at least one graphic object is output on the one portion of the flexible display, and when a touch applied to the touch pad is released, the controller executes any one of the at least one graphic object.

5. The mobile terminal of claim 4, wherein
    a plurality of graphic objects are output on the one portion of the flexible display, and
    the controller sets a plurality of points respectively linked to the plurality of graphic objects with respect to a touch point of the touch pad to which a touch is applied.

6. The mobile terminal of claim 5, wherein
    in a state in which the plurality of graphic objects are output on the one portion of the flexible display, the controller displays a graphic object linked to a point to which a touch is applied, among the plurality of points, such that the graphic object is visually distinguished from the other graphic objects.

7. The mobile terminal of claim 6, wherein
    when the touch is released, the controller outputs an execution screen corresponding to a function linked to the graphic object displayed to be visually distinguished on the one portion of the flexible display.

8. The mobile terminal of claim 1, further comprising:
a home button overlapping a fingerprint recognition sensor,
wherein when fingerprint recognition with respect to a fingerprint of a finger in contact with the home button is successful using the fingerprint recognition sensor in a state in which the main body is folded, the controller outputs a first image related to payment on the one portion of the flexible display.

9. The mobile terminal of claim 8, wherein
when a preset type of touch is applied to the touch pad in a state in which the first image is output, the controller switches the output first image to a second image related to payment.

10. The mobile terminal of claim 8, wherein
when the folded main body is unfolded by an external force, the controller outputs screen information related to payment on the entire region of the flexible display.

11. The mobile terminal of claim 1, wherein
when a predetermined period of time has lapsed in a state in which the main body is folded, the controller enters a first mode, and
when a preset type of touch is applied to the touch pad in the first mode, the controller enters a second mode different from the first mode.

12. The mobile terminal of claim 1, wherein
when a preset type of touch is applied to the touch pad provided on the rear surface of the main body in a state in which the main body is flat, the controller switches the first screen information displayed on the flexible display to second screen information different from the first screen information.

13. The mobile terminal of claim 1, wherein
when a preset type of touch is applied to the touch pad provided on the rear surface in a state in which the main body is flat and the flexible display is inactive, the controller switches the flexible display from the inactive state to an active state.

14. The mobile terminal of claim 1, wherein
when a predetermined period of time has lapsed in a state in which the man body is flat and the flexible display is active, the controller switches the flexible display from the active state to an inactive state, and when a touch is applied to the touch pad before the predetermined period of time has lapsed, the controller maintains the flexible display in the active state.

15. The mobile terminal of claim 1, wherein
when a drag touch is applied to the touch pad in a state in which the main body is flat, the controller controls at least one of brightness of an output of the flexible display and the volume.

16. The mobile terminal of claim 1, further comprising:
a camera,
wherein when a touch is applied to the touch pad in a state in which the main body is flat and a preview image received through the camera is being output on the flexible display, the controller captures the preview image.

17. The mobile terminal of claim 1, wherein
in a state in which the main body is flat and first screen information is output on the flexible display, a preset type of touch is applied to the touch pad after an event occurs, the controller adjusts transparency of the first screen information and the second screen information such that at least one of the first screen information and the second screen information related to the event are identified.

18. A method of controlling a mobile terminal, the method comprising:
allowing a flexible display to be folded such that one portion of the flexible display is exposed; and
controlling the one portion of the flexible display to output screen information linked to a preset type of touch when the preset type of touch is applied to a touch pad provided on a rear surface of a main body in a state in which the flexible display is folded,
wherein when touches applied to both the flexible display and the touch pad are maintained for a predetermined period of time in a state in which the main body is flat, further comprising capturing screen information output on the flexible display.

19. The method of claim 18, wherein
different pieces of screen information are output on the one portion of the flexible display according to touch types applied to the touch pad.

* * * * *